(12) United States Patent
Nakamura et al.

(10) Patent No.: US 7,483,211 B2
(45) Date of Patent: Jan. 27, 2009

(54) OPTICAL TUNABLE FILTER AND METHOD OF MANUFACTURING THE SAME

(75) Inventors: Ryosuke Nakamura, Nagano (JP); Chang Ho Chung, Aichi (JP)

(73) Assignees: Seiko Epson Corporation (JP); Santec Corporation (JP)

( * ) Notice: Subject to any disclaimer, the term of this patent is extended or adjusted under 35 U.S.C. 154(b) by 289 days.

(21) Appl. No.: 11/340,828

(22) Filed: Jan. 26, 2006

(65) Prior Publication Data

US 2006/0183644 A1 Aug. 17, 2006

(30) Foreign Application Priority Data

| Jan. 28, 2005 | (JP) | .............................. 2005-021473 |
| Jan. 28, 2005 | (JP) | .............................. 2005-021474 |
| Jan. 18, 2006 | (JP) | .............................. 2006-010522 |

(51) Int. Cl.
*H01P 1/20* (2006.01)
(52) U.S. Cl. .......................... 359/579; 359/587; 359/589
(58) Field of Classification Search .................. 359/579
See application file for complete search history.

(56) References Cited

U.S. PATENT DOCUMENTS

| 6,341,039 | B1 | 1/2002 | Flanders et al. |
| 6,400,738 | B1 * | 6/2002 | Tucker et al. .................. 372/20 |
| 6,590,710 | B2 * | 7/2003 | Hara et al. ................... 359/579 |
| 6,808,276 | B2 | 10/2004 | Atia et al. |
| 2005/0007933 | A1 | 1/2005 | Yoda |

FOREIGN PATENT DOCUMENTS

JP 2002-174721 6/2002

* cited by examiner

*Primary Examiner*—Fayez G Assaf
(74) *Attorney, Agent, or Firm*—Harness, Dickey & Pierce, P.L.C.

(57) ABSTRACT

An optical tunable filter has a fixed substrate having a first recess formed therein and a movable substrate bonded to the fixed substrate. The movable substrate includes a movable portion having an opening formed at a location facing the first recess and a support portion for supporting the movable portion so that the movable portion can be displaced. The optical tunable filter also has a light-transmittable substrate bonded to the movable portion, a fixed reflection film formed on a bottom of the first recess, and a movable reflection film formed on a surface of the light-transmittable substrate. The optical tunable filter includes an interference gap formed between the fixed reflection film and the movable reflection film. The optical tunable filter also includes an actuator operable to displace the movable portion relative to the fixed substrate.

14 Claims, 22 Drawing Sheets

OPTICAL TUNABLE FILTER AND METHOD OF MANUFACTURING THE SAME

CROSS-REFERENCE

The entire disclosure of Japanese Patent Applications No. 2005-021474 and No. 2005-021473 both filed on Jan. 28, 2005 are expressly incorporated by reference herein.

BACKGROUND OF THE INVENTION

1. Field of the Invention

The present invention relates to an optical tunable filter and a method of manufacturing such an optical tunable filter.

2. Description of the Related Art

There has been known an optical tunable filter for detecting an intensity distribution at each wavelength. The following optical tunable filters have been known in the art.

1) Filter Formed by Surface Micro-Machining

In a conventional optical tunable filter, the thickness of a variable gap is controlled only by the thickness of a sacrifice layer. When the thickness of a variable gap is controlled by the thickness of a sacrifice layer, the variable gap may have variations in thickness depending upon conditions for deposition of the sacrifice layer. Accordingly, uniform Coulomb forces are not produced between a thin film and a drive electrode. As a result, stable driving cannot be achieved.

For example, an optical tunable filter disclosed by JP-A No. 2002-174721 has a movable portion projecting on a surface of a substrate. This type of optical tunable filter has a large thickness.

2) Filter Using SOI Wafer

For example, U.S. Pat. No. 6,341,039 discloses that an $SiO_2$ layer of a silicon-on-insulator (SOI) wafer is employed as a sacrifice layer to form a variable gap. According to this method, a variable gap can be formed with accuracy. However, an insulating structure is not provided between a drive electrode and a movable portion. Accordingly, the movable portion and the drive electrode are stuck on each other when a large electrostatic attraction is caused between the movable portion and the drive electrode.

3) Problems Common to Both Filters

In the above filters, a sacrifice layer is finally released to form a variable gap. In this case, a release hole is required to allow a liquid for release to be introduced into the sacrifice layer. Accordingly, an area to which Coulomb forces are applied is reduced to thereby increase a driving voltage. Further, in a case of a small variable gap, sticking is caused when a sacrifice layer is released. Specifically, a thin film and a drive electrode substrate are stuck on each other due to surface tension of a water. Thus, there has been desired a structure that does not need to release a sacrifice layer.

Further, because a portion of the movable portion through which light passes is made of silicon, a conventional optical tunable filter cannot be used for purposes other than wavelength separation of infrared light.

SUMMARY OF THE INVENTION

The present invention has been made in view of the above drawbacks. It is, therefore, a first object of the present invention to provide an optical tunable filter and a method of manufacturing an optical tunable filter which can prevent attenuation of light emitted from the optical tunable filter and perform wavelength separation on light having various wavelengths.

According to a first aspect of the present invention, there is provided an optical tunable filter which can prevent attenuation of light emitted from the optical tunable filter and perform wavelength separation on light having various wavelengths. The optical tunable filter includes a fixed substrate having a first recess formed therein and a movable substrate bonded to the fixed substrate. The movable substrate has a movable portion having an opening formed at a location facing the first recess and a support portion for supporting the movable portion so that the movable portion can be displaced. The optical tunable filter also has a light-transmittable substrate bonded to the movable portion at a location near the opening, a fixed reflection film formed on a bottom of the first recess, and a movable reflection film formed on a surface of the light-transmittable substrate which faces the first recess. The optical tunable filter includes an interference gap formed between the fixed reflection film and the movable reflection film for causing interference of light due to repeated reflection between the fixed reflection film and the movable reflection film. The optical tunable filter also includes an actuator operable to displace the movable portion relative to the fixed substrate to vary a size of the interference gap for emitting light having a wavelength corresponding to the size of the interference gap to an exterior of the optical tunable filter. The light-transmittable substrate may be provided on or bonded to a surface of the movable portion which faces the fixed substrate.

According to a second aspect of the present invention, there is provided an optical tunable filter which can prevent attenuation of light emitted from the optical tunable filter and perform wavelength separation on light having various wavelengths. The optical tunable filter includes a first fixed substrate having a first recess formed therein and a movable substrate bonded to the first fixed substrate. The movable substrate has a movable portion having an opening formed at a location facing the first recess and a support portion for supporting the movable portion so that the movable portion can be displaced. The optical tunable filter also has a light-transmittable substrate bonded to the movable portion at a location corresponding to the opening and a second fixed substrate bonded to a surface of the movable substrate which is opposite to the first fixed substrate. The second fixed substrate has a second recess formed at a location facing the movable portion. The optical tunable filter includes a fixed reflection film formed on a bottom of the second recess in the second fixed substrate and a movable reflection film formed on a surface of the light-transmittable substrate which faces the second recess. The optical tunable filter also includes an interference gap formed between the fixed reflection film and the movable reflection film for causing interference of light due to repeated reflection between the fixed reflection film and the movable reflection film. The optical tunable filter includes an actuator operable to displace the movable portion relative to the second fixed substrate to vary a size of the interference gap for emitting light having a wavelength corresponding to the size of the interference gap to an exterior of the optical tunable filter. The actuator has a drive gap formed between a bottom of the first recess and the movable substrate.

According to the present invention, it is possible to perform wavelength separation on light having various wavelengths, e.g., visible light. Further, since the movable reflection film is formed on the light-transmittable substrate, the movable reflection film can have a uniform thickness (film thickness). Accordingly, light is prevented from being attenuated due to non-uniformity of the thickness of the movable reflection film.

The fixed substrate may include a second recess formed in a surface thereof which faces the movable substrate. The actuator may include a drive gap formed between a bottom of the second recess and the movable substrate for displacing the movable portion relative to the fixed substrate within the drive gap. In this case, a structure and a manufacturing process of the optical tunable filter can be simplified, and the optical tunable filter can be made compact in size.

The second recess may have a depth smaller than the first recess. In this case, an electrode can be provided on the second recess to displace the movable portion with a small voltage applied when a Coulomb force is employed to displace the movable portion.

The optical tunable filter may further include a first antireflection film formed on a surface of the fixed substrate which is opposite to the interference gap and a second antireflection film formed on a surface of the light-transmittable substrate which is opposite to the interference gap. These antireflection films can reduce reflection of light, and the optical tunable filter can efficiently transmit light.

The second recess may be formed outside of the first recess so as to be continuously connected to the first recess. In this case, formation of the first recess is facilitated.

The optical tunable filter may further include a driving electrode provided on the bottom of the second recess. The movable substrate may have an electric conductivity. The actuator may be configured to displace the movable portion with a Coulomb force produced due to a potential difference between the movable portion and the driving electrode. In such a case, it is possible to stably drive the movable portion.

Attraction due to a Coulomb force may be utilized to displace the movable portion through the drive gap in a direction in which the interference gap is reduced. In this case, it is possible to reduce electric consumption.

At least one of surfaces of the movable substrate and the driving electrode may be subjected to insulating treatment. In this case, it is possible to prevent short circuit between the drive electrode and the movable substrate. It is desirable that the insulating treatment is performed to form an insulating film made of silicon oxide, silicon nitride, or silicon oxynitride. In such a case, it is possible to form a reliable insulating structure with simple operation.

It is desirable that the light-transmittable substrate allows infrared light and light having a wavelength shorter than that of infrared light to pass therethrough. In such a case, it is possible to separate infrared light and light having a wavelength shorter than that of infrared light.

The fixed substrate may have a light transmittance. External light may be introduced into the interference gap from the fixed substrate. In this case, external light can reliably be introduced into the interference gap.

The light-transmittable substrate may be provided on a surface of the movable portion which faces the fixed substrate. In this case, the optical tunable filter can have a thin and compact structure.

The light-transmittable substrate may be bonded on a surface of the movable portion which faces the fixed substrate. In this case, it is possible to readily bond the light-transmittable substrate to the movable portion.

The light-transmittable substrate may be provided on a surface of the movable portion which is opposite to the fixed substrate. In this case, it is possible to readily prevent the movable portion from being brought into contact with the fixed substrate.

The light-transmittable substrate may be bonded on a surface of the movable portion which is opposite to the fixed substrate. In this case, it is possible to readily bond the light-transmittable substrate to the movable portion.

The movable reflection film may be provided within the opening. In this case, the optical tunable filter can have a thin and compact structure.

The light-transmittable substrate may cover the opening. In this case, it is possible to reliably prevent light other than interfering light from being emitted to an exterior of the optical tunable filter.

The movable substrate may be made of silicon. In this case, the movable substrate can have an electric conductivity and stably be driven.

The movable portion may have a substantially circular shape in a plan view. In this case, the movable portion can be driven efficiently.

Each of the fixed substrate and the light-transmittable substrate may be made of glass. In this case, light can efficiently pass through the fixed substrate and the light-transmittable substrate. Preferably, each of the fixed substrate and the light-transmittable substrate may be made of glass containing alkali metal. In this case, the fixed substrate and the movable substrate, and the movable substrate and the light-transmittable substrate can be bonded firmly to each other with high adhesiveness, respectively.

The movable portion and the support portion may be formed integrally with each other. In this case, the movable portion can be driven efficiently.

Each of the fixed reflection film and the movable reflection film may be formed of a multilayer film. In this case, the thickness of the reflection films can readily be changed so as to facilitate a manufacturing process of the reflection films.

The movable reflection film may have an insulating property. In this case, it is not necessary to provide an insulating film separately. Accordingly, the structure of the optical tunable filter can be simplified.

The antireflection films may be formed of a multilayer film. In this case, the thickness of the antireflection films can readily be changed so as to facilitate a manufacturing process of the antireflection films.

The movable portion may be housed in a closed space defined by the first recess and the second recess. In this case, it is possible to stably drive the movable portion.

Attraction due to a Coulomb force may be utilized to displace the movable portion through the drive gap in a direction in which the interference gap is increased. In this case, it is possible to reduce electric consumption.

The light-transmittable substrate may be provided on a surface of the movable portion which faces the second recess. In this case, it is possible to readily prevent the movable portion from being brought into contact with the second fixed substrate.

The light-transmittable substrate may be bonded to a surface of the movable portion which faces the second recess. In this case, it is possible to readily bond the light-transmittable substrate to the movable portion.

The light-transmittable substrate may be provided on a surface of the movable portion which faces the first recess. The light-transmittable substrate may be bonded to a surface of the movable portion which faces the first recess.

The light-transmittable substrate may have a recessed portion formed at a location corresponding to the opening, and the movable reflection film may be formed within the recessed portion in the light-transmittable substrate. In this case, it is possible to readily bond the light-transmittable substrate to the movable portion.

Each of the first fixed substrate, the light-transmittable substrate, and the second fixed substrate may be made of glass. In this case, light can efficiently pass through the first fixed substrate, the light-transmittable substrate, and the second fixed substrate. Preferably, each of the first fixed substrate, the light-transmittable substrate, and the second fixed substrate may be made of glass containing alkali metal. In this case, the first fixed substrate and the movable substrate, the movable substrate and the light-transmittable substrate, and the movable substrate and the second fixed substrate can be bonded firmly to each other with high adhesiveness, respectively.

The optical tunable filter may further includes a first antireflection film formed on a surface of the first fixed substrate which is opposite to the first recess and a second antireflection film formed on a surface of the second fixed substrate which is opposite to the second recess. These antireflection films can reduce reflection of light, and the optical tunable filter can efficiently transmit light.

According to a third aspect of the present invention, there is provided a method of manufacturing an optical tunable filter which can prevent attenuation of light emitted from the optical tunable filter and perform wavelength separation on light having various wavelengths. In this method, a first recess and a second recess are formed in a surface of a fixed substrate. A fixed reflection film is formed on a bottom of the first recess in the fixed substrate. A base material is bonded to the fixed substrate. A predetermined portion of the base material is removed to produce a movable substrate having a movable portion with an opening formed at a location facing the first recess and a support portion for supporting the movable portion so that the movable portion can be displaced. A movable reflection film is formed on a light-transmittable substrate. The light-transmittable substrate is bonded to a surface of the movable portion which is opposite to the fixed substrate at a location near the opening in a state such that the movable reflection film on the light-transmittable substrate faces the fixed reflection film. A drive gap is formed between the movable substrate and a bottom of the second recess in the fixed substrate for displacing the movable portion. An interference gap is formed between the movable reflection film and the fixed reflection film for causing interference of light due to repeated reflection between the fixed reflection film and the movable reflection film.

According to the present invention, it is possible to readily manufacture an optical tunable filter which can perform wavelength separation even on visible light and can include a movable reflection film having a uniform thickness (film thickness).

Anode bonding may be conducted to bond the base material to the fixed substrate and the light-transmittable substrate to the movable portion. In this case, the base material and the fixed substrate, and the fixed substrate and the light-transmittable substrate can be bonded firmly to each other with high adhesiveness, respectively.

According to a fourth aspect of the present invention, there is provided a method of manufacturing an optical tunable filter which can prevent attenuation of light emitted from the optical tunable filter and perform wavelength separation on light having various wavelengths. In this method, a first recess and a second recess are formed in a surface of a fixed substrate. A fixed reflection film is formed on a bottom of the first recess in the fixed substrate. A movable reflection film is formed on a light-transmittable substrate. The light-transmittable substrate is bonded to a base material in a state such that the movable reflection film on the light-transmittable substrate is located at an opposite side of the base material. The base material is bonded to the fixed substrate in a state such that the movable reflection film on the light-transmittable substrate faces the fixed reflection film. A predetermined portion of the base material which corresponds to the light-transmittable substrate is removed to produce a movable substrate having a movable portion with an opening formed at a location facing the first recess and a support portion for supporting the movable portion so that the movable portion can be displaced. A drive gap is formed between the movable substrate and a bottom of the second recess in the fixed substrate for displacing the movable portion. An interference gap is formed between the movable reflection film and the fixed reflection film for causing interference of light due to repeated reflection between the fixed reflection film and the movable reflection film.

According to the present invention, it is possible to readily manufacture an optical tunable filter which can perform wavelength separation even on visible light and can include a movable reflection film having a uniform thickness (film thickness).

Anode bonding may be conducted to bond the base material to the light-transmittable substrate, and the base material to the fixed substrate. In this case, the base material and the light-transmittable substrate, and the base material and the fixed substrate can be bonded firmly to each other with high adhesiveness, respectively.

The first recess and the second recess may be formed in the fixed substrate by an etching method. In this case, the first recess and the second recess can be formed with high accuracy.

According to a fifth aspect of the present invention, there is provided a method of manufacturing an optical tunable filter which can prevent attenuation of light emitted from the optical tunable filter and perform wavelength separation on light having various wavelengths. In this method, a first recess is formed in a first fixed substrate. A base material is bonded to the first fixed substrate. A predetermined portion of the base material is removed to produce a movable substrate having a movable portion with an opening and a support portion for supporting the movable portion so that the movable portion can be displaced. A movable reflection film is formed on a light-transmittable substrate. The light-transmittable substrate is bonded to a surface of the movable substrate which is opposite to the first fixed substrate at a location near the opening. A second recess is formed in a second fixed substrate. A fixed reflection film is formed on a bottom of the second recess in the second fixed substrate. The second fixed substrate is bonded to the movable substrate in a state such that the fixed reflection film faces the movable reflection film on the light-transmittable substrate. A drive gap is formed between the movable substrate and a bottom of the first recess in the first fixed substrate for displacing the movable portion. An interference gap is formed between the movable reflection film and the fixed reflection film for causing interference of light due to repeated reflection between the fixed reflection film and the movable reflection film.

According to the present invention, it is possible to readily manufacture an optical tunable filter which can perform wavelength separation even on visible light and can include a movable reflection film having a uniform thickness (film thickness).

Anode bonding may be conducted to bond the base material to the second fixed substrate, the light-transmittable substrate to the movable portion, and the movable substrate to the first fixed substrate. In this case, the base material and the first fixed substrate, and the movable substrate and the light-transmittable substrate can be bonded firmly to each other with high adhesiveness, respectively.

According to a sixth aspect of the present invention, there is provided a method of manufacturing an optical tunable filter which can prevent attenuation of light emitted from the optical tunable filter and perform wavelength separation on light having various wavelengths. In this method, a first recess is formed in a first fixed substrate. A recessed portion is formed in a light-transmittable substrate. A movable reflection film is formed in the recessed portion of the light-transmittable substrate. The light-transmittable substrate is bonded to a base material in a state such that the movable reflection film on the light-transmittable substrate faces the base material. The base material is bonded to the first fixed substrate in a state such that the light-transmittable substrate faces the first recess. A predetermined portion of the base material which corresponds to the light-transmittable substrate is removed to produce a movable substrate having a movable portion with an opening and a support portion for supporting the movable portion so that the movable portion can be displaced. A second recess is formed in a second fixed substrate. A fixed reflection film is formed on a bottom of the second recess in the second fixed substrate. The second fixed substrate is bonded to the movable substrate in a state such that the fixed reflection film faces the movable reflection film on the light-transmittable substrate. A drive gap is formed between the movable substrate and a bottom of the first recess in the first fixed substrate for displacing the movable portion. An interference gap is formed between the movable reflection film and the fixed reflection film for causing interference of light due to repeated reflection between the fixed reflection film and the movable reflection film.

According to the present invention, it is possible to readily manufacture an optical tunable filter which can perform wavelength separation even on visible light and can include a movable reflection film having a uniform thickness (film thickness).

Anode bonding may be conducted to bond the base material to the light-transmittable substrate, the base material to the second fixed substrate, and the first fixed substrate to the movable substrate. In this case, the base material and the light-transmittable substrate, and the base material and the first fixed substrate can be bonded firmly to each other with high adhesiveness, respectively.

The first recess may be formed in the first fixed substrate by an etching method. The second recess may be formed in the second fixed substrate by an etching method. In this case, the first recess and the second recess can be formed with high accuracy.

The above and other objects, features, and advantages of the present invention will be apparent from the following description when taken in conjunction with the accompanying drawings which illustrate preferred embodiments of the present invention by way of example.

DETAILED DESCRIPTION OF THE PREFERRED EMBODIMENTS

Figure 1:
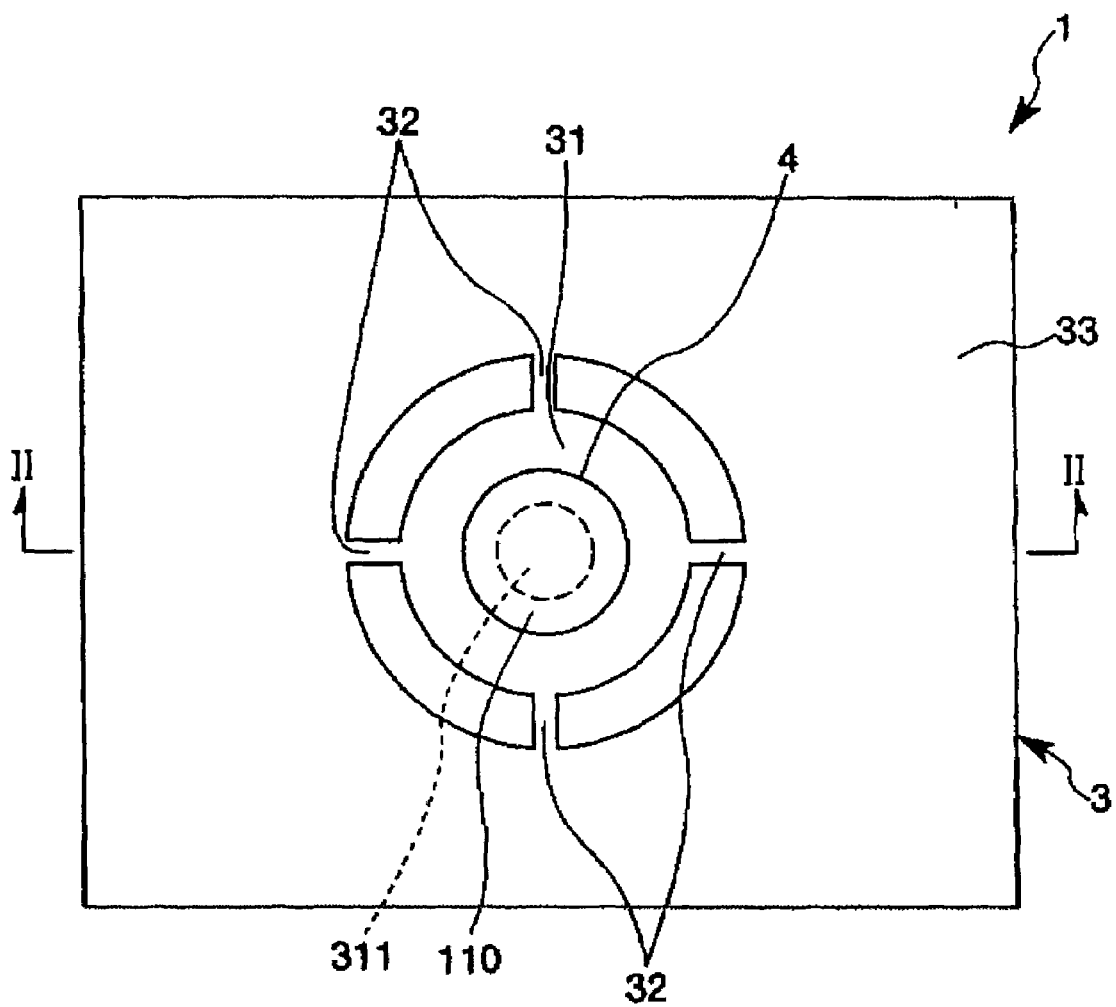
FIG. 1 is a plan view showing an optical tunable filter according to a first embodiment of the present invention.

Embodiments of an optical tunable filter according to the present invention will be described below with reference to FIGS. 1 through 14D. Like or corresponding parts are denoted by like or corresponding reference numerals throughout drawings, and will not be described below repetitively.

First Embodiment

Figure 2:
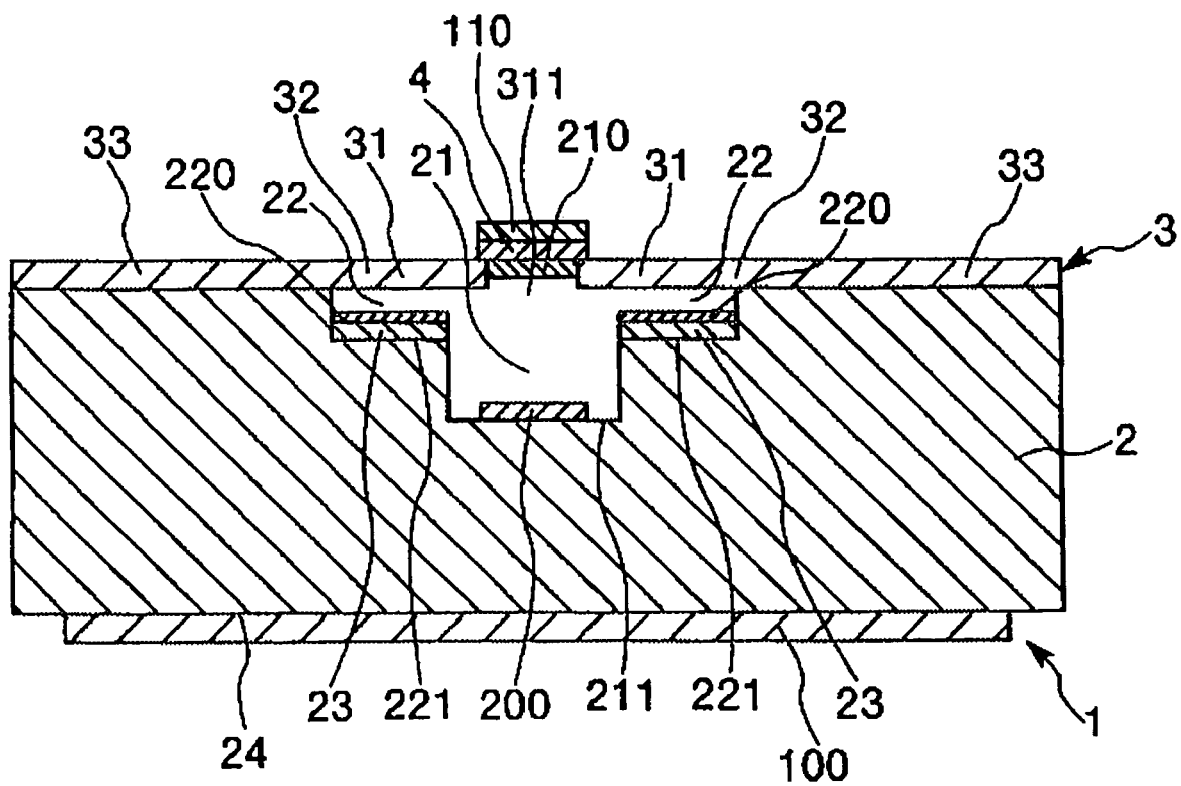
FIG. 2 is a cross-sectional view taken along line II-II in FIG. 1.
Figure 3:
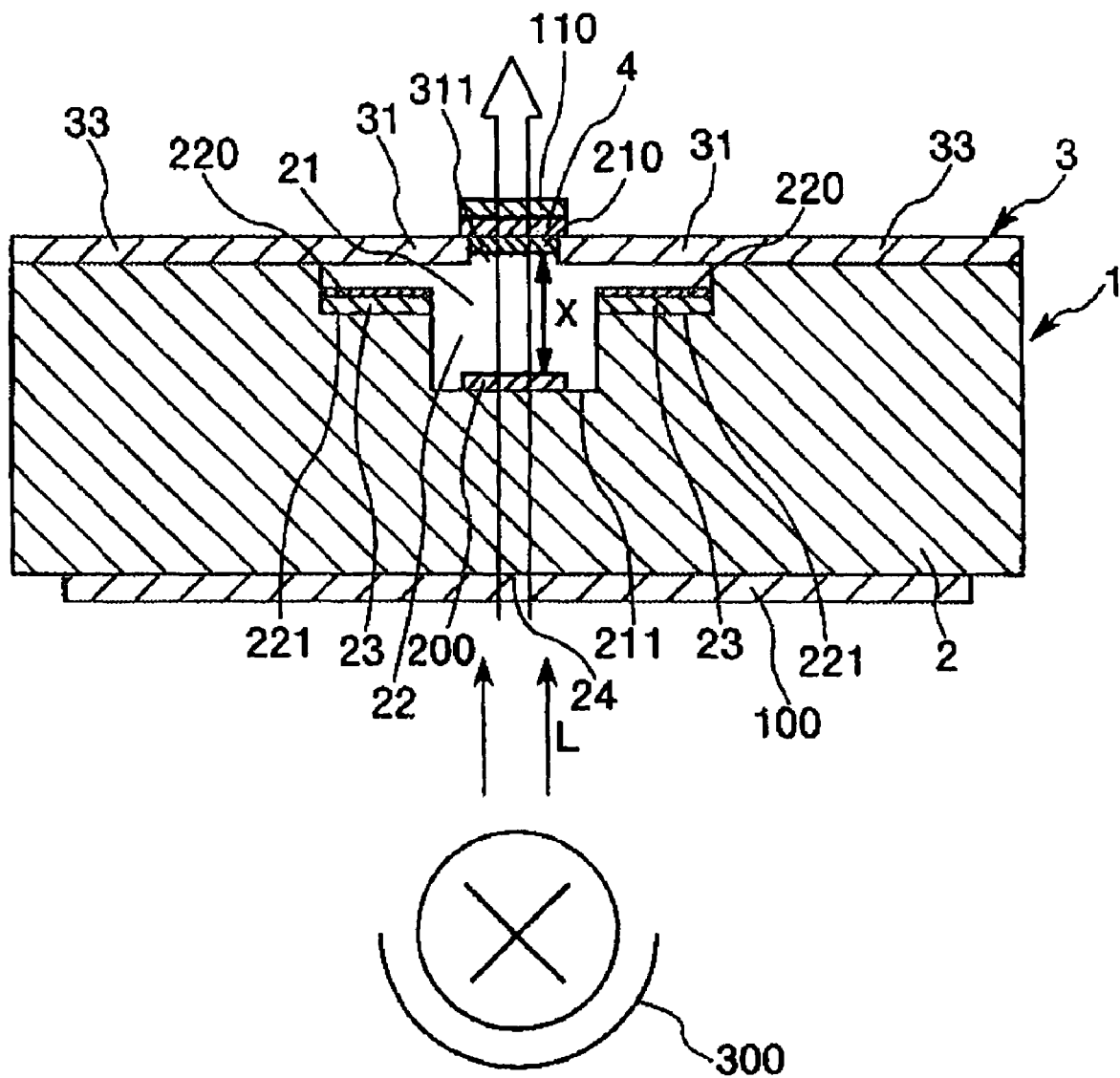
FIG. 3 is a diagram explanatory of an operation of the optical tunable filter shown in FIG. 1.

FIG. 1 is a plan view (top view) showing an optical tunable filter 1 according to a first embodiment of the present invention. FIG. 2 is a cross-sectional view taken along line II-II in FIG. 1. FIG. 3 is a diagram explanatory of an operation of the optical tunable filter 1. In the following description, upper and lower sides in FIG. 2 will be referred to as "upper" and "lower," respectively.

For example, the optical tunable filter 1 serves as a device for receiving light and emitting light (coherent light) corresponding to a predetermined frequency. As shown in FIG. 2, the optical tunable filter 1 includes a fixed substrate 2 having a light transmittance, a movable substrate 3 facing the fixed substrate 2, a light-transmittable substrate 4 having a light transmittance, an interference gap 21, and a drive gap 22. The movable substrate 3 has an electric conductivity and a light transmittance. The interference gap 21 and the drive gap 22 are formed between the fixed substrate 2 and the movable substrate 3. For example, it is desirable that the fixed substrate 2 is made of glass, preferably glass containing alkali metal.

The fixed substrate 2 has a first recess 211 and a second recess 221 formed in a surface of the fixed substrate 2 which faces the movable substrate 3. The second recess 221 has a depth smaller than the first recess 211. The second recess 221 is formed outside of the first recess 211 so as to be continuously connected to the first recess 211. The first recess 211 has an outside shape corresponding to an outside shape of a movable portion 31 of the movable substrate 3, which will be described later. In the present embodiment, the first recess 211 has a substantially circular shape in a plan view. The first recess 211 has a dimension (outside dimension) slightly smaller than that of the movable portion 31. The second recess 221 has an outside shape corresponding to the outside shape of the movable portion 31. In the present embodiment, the second recess 221 has a substantially circular shape in a plan view. The second recess 221 has a dimension (outside dimension) slightly larger than that of the movable portion 31.

The optical tunable filter 1 has a fixed reflection film (HR coat) 200 disposed on a bottom of the first recess 211. The fixed reflection film 200 has insulating properties and efficiently reflects light. The fixed reflection film 200 is formed of a multilayer film. The fixed reflection film 200 is arranged so as to overlap at least the entire opening 311, which will be described below, in a plan view. (When the fixed reflection film 200 is projected on the movable substrate 3, the projection is located on a portion corresponding to the opening 311 and its vicinity). In the present embodiment, the interference gap 21 is defined between the fixed reflection film 200 and a movable reflection film 210, which will be described later.

The optical tunable filter 1 has a drive electrode 23 disposed on a bottom of the second recess 221. The drive electrode 23 has an electric conductivity. The drive electrode 23 is configured to apply a voltage to the optical tunable filter 1 from an exterior of the optical tunable filter 1 via a conductive layer (not shown). Thickness (average thickness) of the drive electrode 23 is appropriately selected according to a material used for the drive electrode 23, an application thereof, and the like and is not limited to a specific value. Preferably, the drive electrode 23 has a thickness of about 0.1 to 5 μm. The optical tunable filter 1 also includes an insulating film 220 formed on a surface of the drive electrode 23. The insulating film 220 has insulating properties.

As shown in FIG. 2, the fixed substrate 2 has a lower surface forming a light incident portion 24. The light incident portion 24 is adapted to introduce external light into the interference gap 21 via the fixed substrate 2. The optical tunable filter 1 includes an antireflection film (AR coat) 100 on a surface of the light incidence portion 24, i.e., a surface of the fixed substrate 2 opposite to the interference gap 21. The antireflection film 100 serves to regulate reflection of external light (incident light).

Thickness (average thickness) of the fixed substrate 2 is appropriately selected according to a material used for the fixed substrate 2, an application thereof, and the like and is not limited to a specific value. Preferably, the fixed substrate 2 has a thickness of about 10 to 2000 μm, more preferably about 100 to 1000 μm. Thickness (average thickness) of the interference gap 21 is appropriately selected according to an application of the interference gap 21 and the like and is not limited to a specific value. Preferably, the interference gap 21 has a thickness of about 1 to 100 μm.

The movable substrate 3 is made of silicon (Si). The movable substrate 3 includes a movable portion 31 centrally arranged in the movable substrate 3, support portions 32 for supporting the movable portion 31 in a state such that the movable portion 31 can be displaced (moved) in a vertical direction in FIG. 2, and a fixed portion 33. The movable portion 31 has a substantially circular shape in a plan view. The movable substrate 3 is fixed (bonded) to the fixed substrate 2 at the fixed portion 33.

The movable portion 31 includes an opening 311 having a substantially circular shape in a plan view. The opening 311 is formed concentrically with a circle forming the movable portion 31. The opening 311 is located above the first recess 211 (at a position facing the first recess 211) with the interference gap 21 interposed between the opening 311 and the first recess 211. The movable portion 31 is arranged such that a peripheral portion (outside portion) of the movable portion 31 faces the second recess 221. The drive gap 22 is formed by a space in the second recess 221. Specifically, the movable portion 31 and the second recess 221 define the drive gap 22. Thickness (average thickness) of the drive gap 22 is appropriately selected according to an application of the drive gap 22 and the like and is not limited to a specific value. Preferably, the drive gap 22 has a thickness of about 0.5 to 20 μm.

The drive electrode 23, the drive gap 22, and the peripheral portion of the movable portion 31 form a main portion of a driving unit (actuator) to drive the movable portion 31 with Coulomb forces.

The shapes of the movable portion 31 and the opening 311 are not limited to specific examples shown in FIGS. 1 and 2. Preferably, the opening 311 has substantially a similar shape to the movable portion 31. Thickness (average thickness) of the movable portion 31 is appropriately selected according to a material used for the movable portion 31, an application thereof, and the like and is not limited to a specific value. Preferably, the movable portion 31 has a thickness of about 1 to 500 μm, more preferably about 10 to 100 μm. When the movable portion 31 has a thickness within the above range, it has an improved driving efficiency. Driving operation of the movable portion 31 will be described later.

The movable substrate 3 has four support portions 32, 32, 32, 32 formed integrally with the movable portion 31 and the fixed portion 33, respectively, near the center of FIG. 1. Each support portion 32 has elasticity (flexibility) and serves to support the movable portion 31 so that the movable portion 31 can be displaced. Thus, the movable portion 31 is connected to the fixed portion 33 via the respective support portions 32. The support portions 32 are arranged on an outer circumferential surface of the movable portion 31 at equal angular intervals (intervals of 90°) with openings interposed between adjacent support portions 32. The number of the support portions 32 is not limited to four. For example, one, two, three, five or more support portions 32 may be provided. Further, the shape of the support portions 32 is not limited to the illustrated example.

The light-transmittable substrate 4 allows infrared light and light having a wavelength shorter than that of infrared light to pass therethrough. The light-transmittable substrate 4 is bonded to the movable portion 31 at a location near the opening 311. Specifically, the light-transmittable substrate 4 is bonded to (provided on) a surface (upper surface in FIG. 2) of the movable portion 31 which is opposite to a surface facing the bottom of the first recess 211. The light-transmittable substrate 4 covers the entire area of the opening 311. For example, it is desirable that the light-transmittable substrate 4 is made of the same material as the fixed substrate 2.

The optical tunable filter 1 has a movable reflection film (HR coat) 210 formed on a surface (lower surface in FIG. 2) of the light-transmittable substrate 4 which faces the first recess 211. The movable reflection film 210 can efficiently reflect light. The movable reflection film 210 is disposed so as to face the fixed reflection film 200 with interference gap 21 interposed between the movable reflection film 210 and the fixed reflection film 200. Further, the movable reflection film 210 is received in the opening 311. Specifically, as viewed in a thickness direction of the optical tunable filter 1 (in a vertical direction in FIG. 2), the entire movable reflection film 210 is located in the opening 311. The movable reflection film 210 is formed on the light-transmittable substrate 4 so as to have uniform thickness (film thickness). A material used for the movable reflection film 210 is not limited to specific one. For example, it is desirable that the movable reflection film 210 is made of the same material as the fixed reflection film 200.

Specifically, it is desirable that the movable reflection film 210 also serves as an insulating film.

The optical tunable filter 1 has an antireflection film 110 formed on a surface (upper surface in FIG. 2) of the light-transmittable substrate 4 which is opposite to the interference gap 21. A material used for the antireflection film 110 is not limited to specific one. For example, it is desirable that the antireflection film 110 is made of the same material as the antireflection film 100.

With the optical tunable filter 1 thus constructed, when a voltage is applied between the conductive layer and the fixed portion 33, the drive electrode 23 and the movable portion 31 are charged in opposite polarities to produce a potential difference therebetween. As a result, Coulomb forces (electrostatic forces) are produced between the drive electrode 23 and the movable portion 31. The attraction due to Coulomb forces is utilized to displace the movable portion 31 through the drive gap 22 in a direction in which the interference gap 21 is reduced. Accordingly, the movable portion 31 is displaced relative to the fixed substrate 2 (downwardly in FIG. 2) and comes to a standstill.

In this case, for example, when an applied voltage is varied continuously or gradually, the movable portion 31 can be moved to a predetermined position in the vertical direction relative to the fixed substrate 2. Accordingly, a distance x of the interference gap 21 can be adjusted (changed) to a predetermined value. Thus, it is possible to emit light (coherent light) having a predetermined wavelength as described later.

Operations (effects) of an optical tunable filter according to the present invention will be described with reference to FIG. 3.

As shown in FIG. 3, light L emitted from a light source 300 is introduced into the optical tunable filter 1 from the light incident portion 24. Specifically, the light L passes through the antireflection film 100, the fixed substrate 2, and the fixed reflection film 200 into the interference gap 21. The light L introduced into the interference gap 21 is repeatedly reflected between the fixed reflection film 200 and the movable reflection film 210 to thereby cause interference. In this case, the fixed reflection film 200 and the movable reflection film 210 can reduce a loss of the light L. As a result of the interference of the light L, light having a wavelength corresponding to the distance x, which is hereinafter referred to as "coherent light," is allowed to pass through the movable reflection film 210. Thus, the coherent light is emitted via the opening 311, the light-transmittable substrate 4, and the antireflection film 110 to an exterior of the optical tunable filter 1.

As described above, according to the optical tunable filter 1, coherent light is emitted via the opening 311 and the light-transmittable substrate 4. Accordingly, it is possible to separate not only infrared light but also light having a specific wavelength shorter than that of infrared light, such as ultraviolet light or visible light.

Further, since the movable reflection film 210 is provided on the light-transmittable substrate 4, the movable reflection film 210 can have a uniform thickness (film thickness). Thus, the movable reflection film 210 has high planarity. Accordingly, the coherent light emitted from the optical tunable filter 1 is reliably prevented from being attenuated.

Furthermore, since the insulating film 220 is formed on the surface of the drive electrode 23, it is possible to prevent short circuit which would be caused when the drive electrode 23 and the movable portion 31 are brought into contact with each other.

The antireflection film 100 and the antireflection film 110 can reduce reflection of light introduced into the optical tunable filter 1 and reflection of coherent light interfering in the interference gap 21. Accordingly, the optical tunable filter 1 can efficiently transmit light.

In the present embodiment, since the movable portion 31 has a substantially circular shape in a plan view, it is possible to efficiently drive the movable portion 31.

A method of manufacturing an optical tunable filter according to the present invention will be described below by using an optical tunable filter 1 shown in FIG. 1 as an example.

Figure 4A:
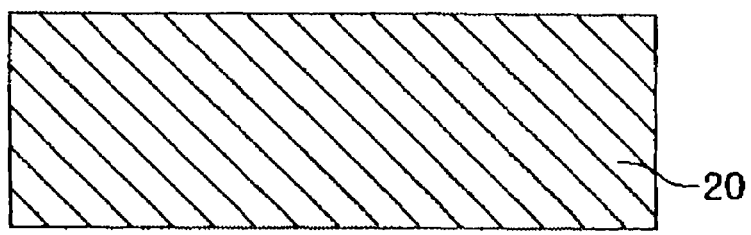
FIGS. 4A through 4R are diagrams explanatory of a method of manufacturing an optical tunable filter according to the first embodiment.
Figure 4B:
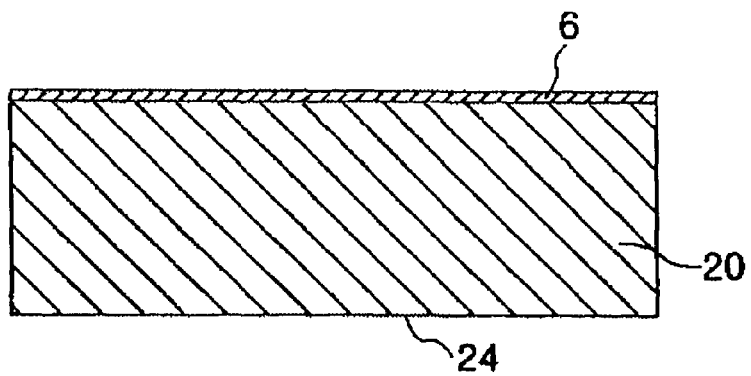
Figure 4C:
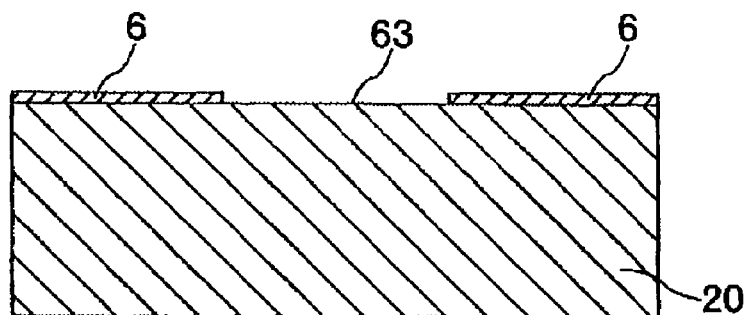
Figure 4D:
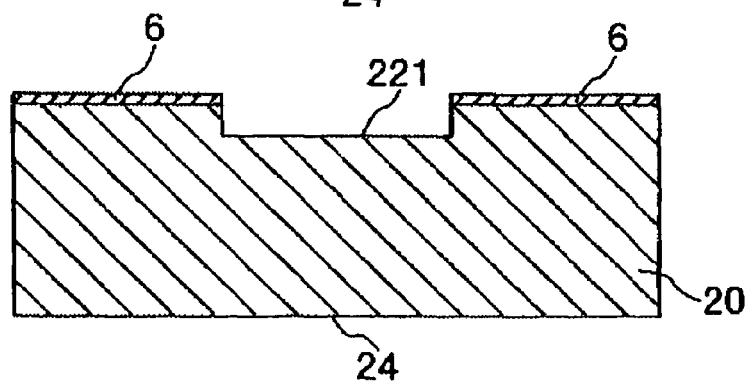
Figure 4E:
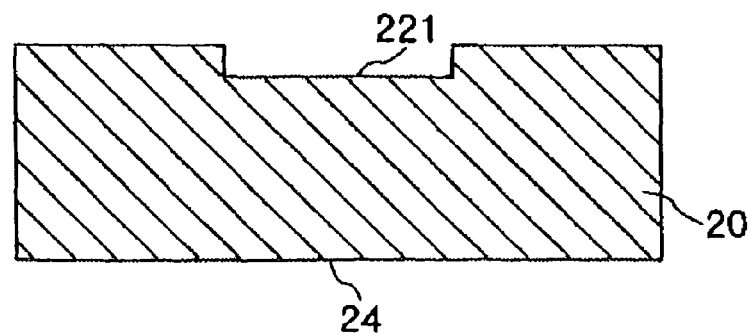
Figure 4F:
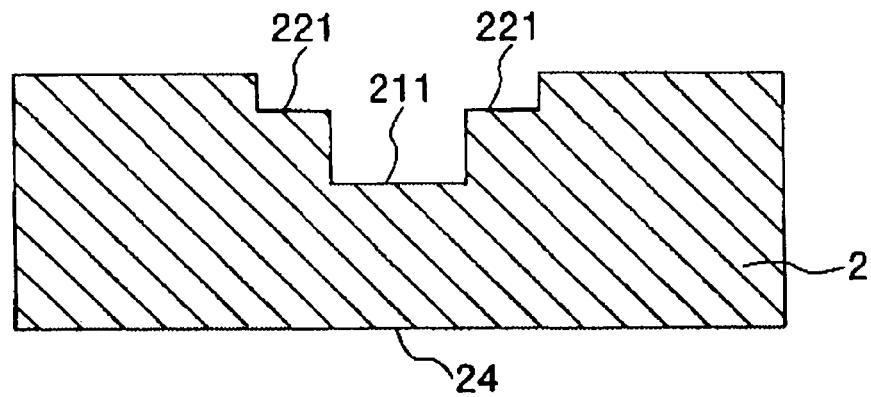
Figure 4G:
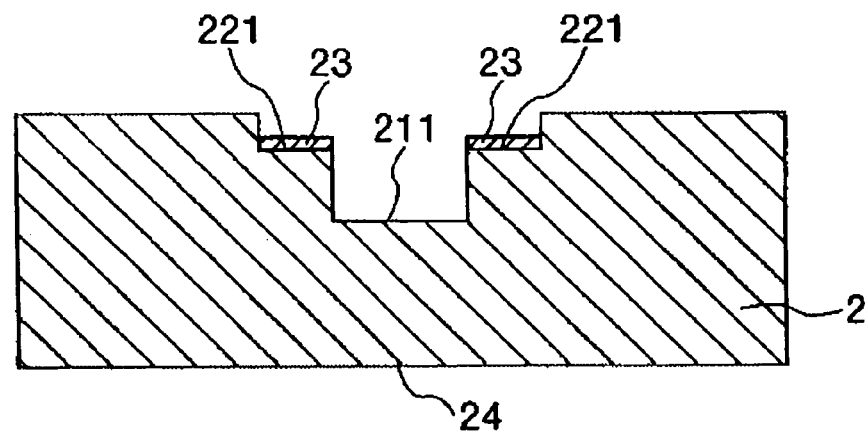
Figure 4H:
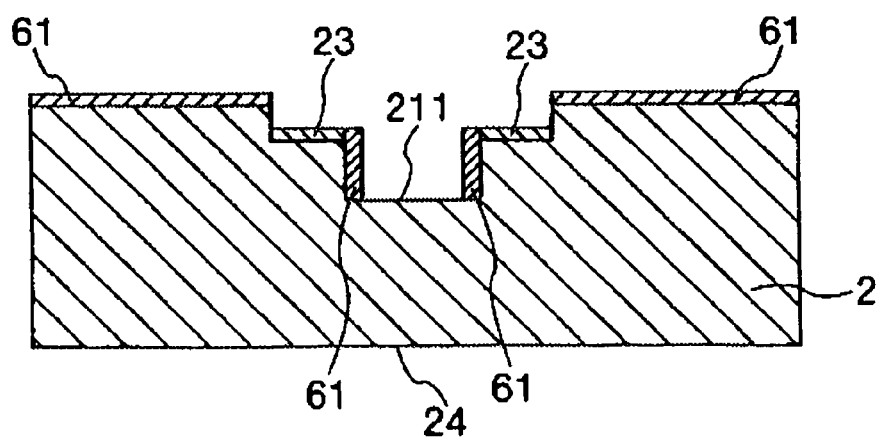
Figure 4I:
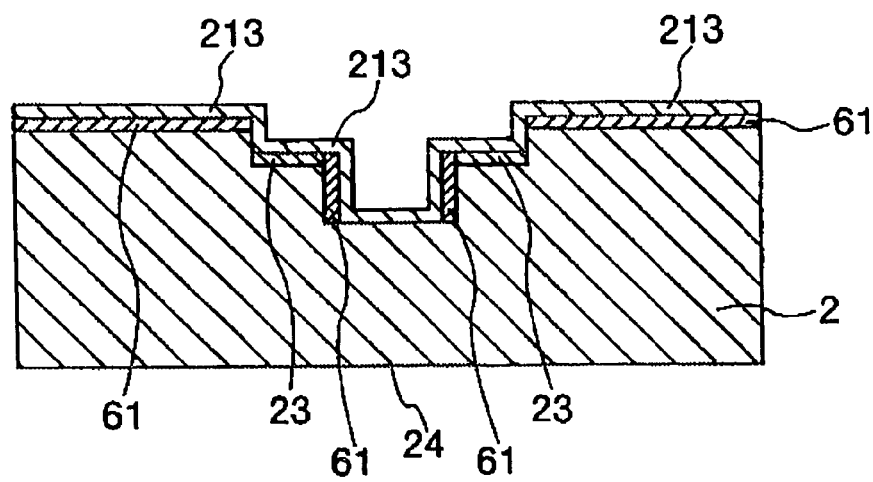
Figure 4J:
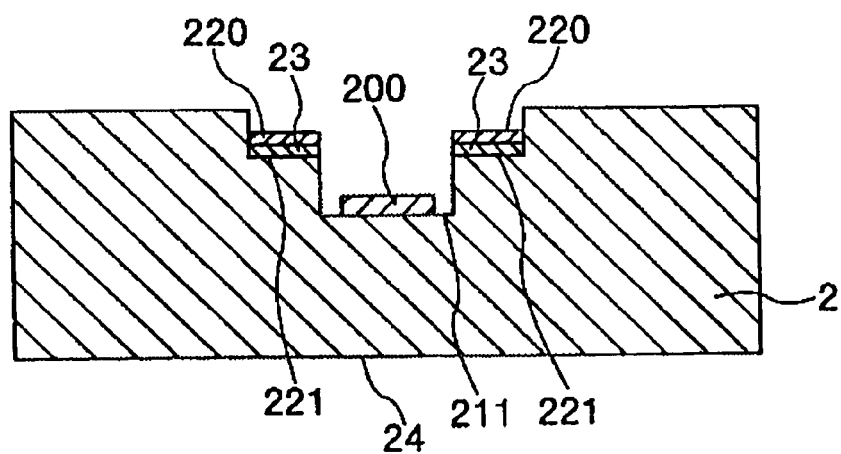
Figure 4K:
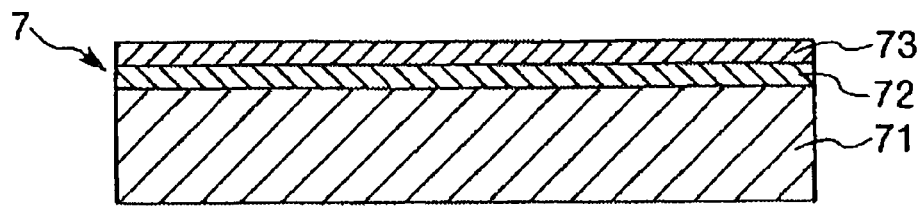
Figure 4L:
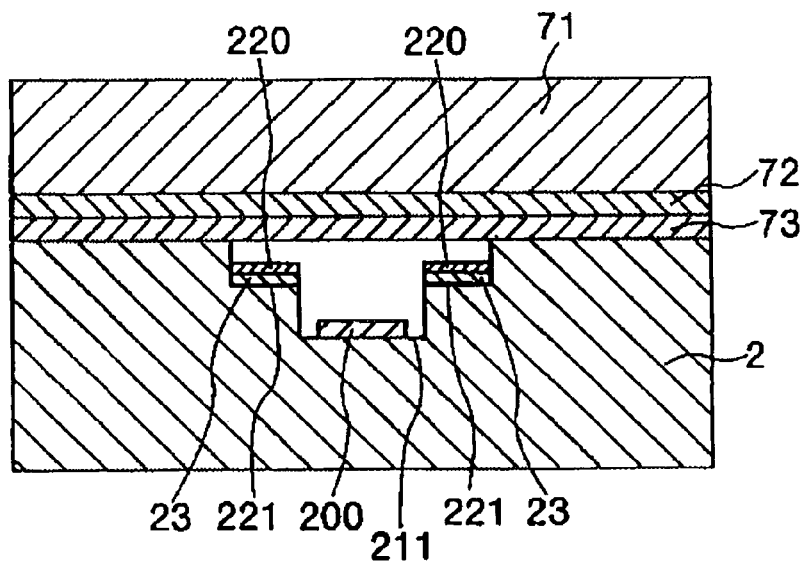
Figure 4M:
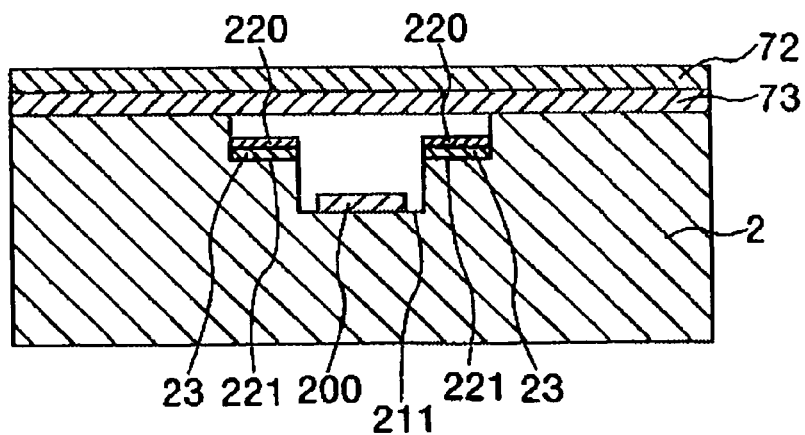
Figure 4N:
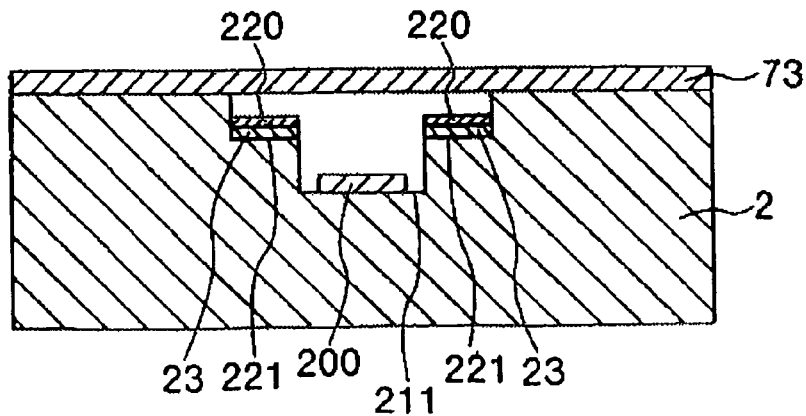
Figure 4O:
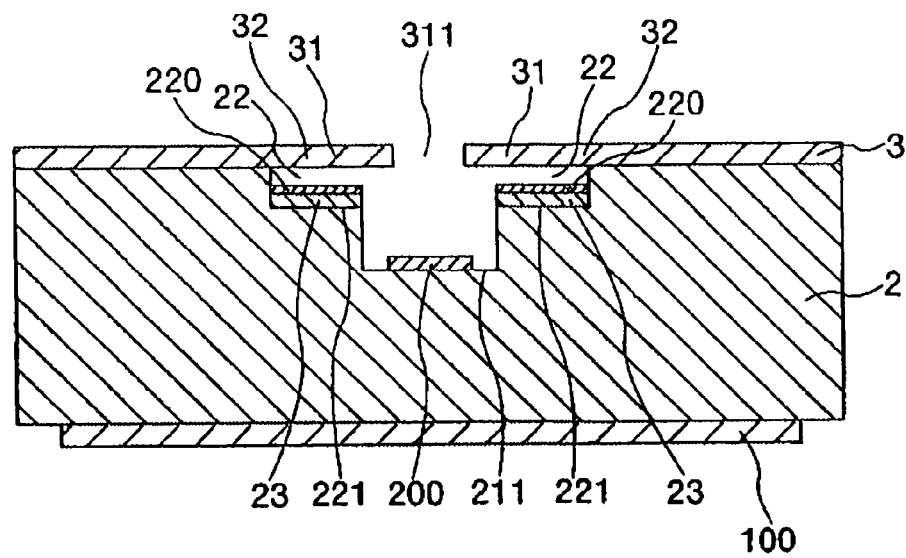
Figure 4P:
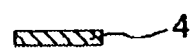
Figure 4Q:
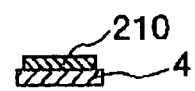
Figure 4R:
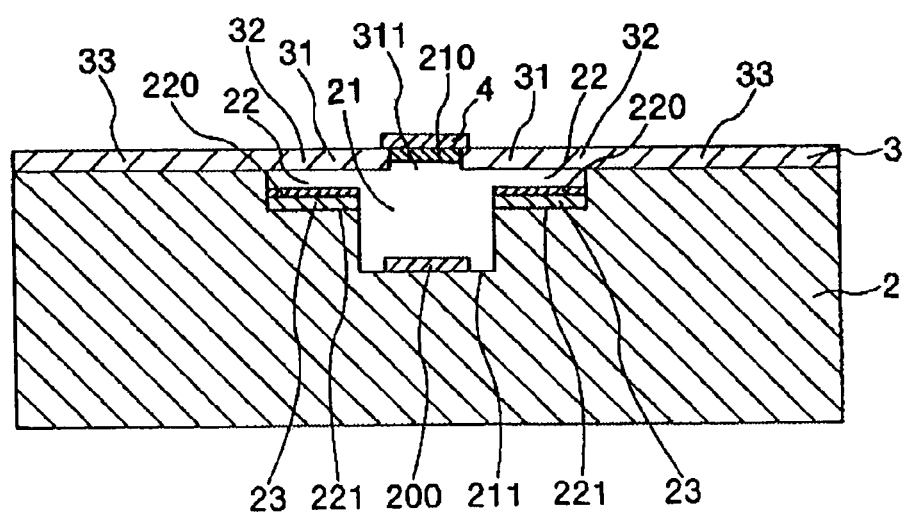

FIGS. 4A through 4R are diagrams explanatory of a method of manufacturing an optical tunable filter according to the first embodiment (diagrams schematically showing a manufacturing process). In the following description, upper and lower sides in FIGS. 4A through 4R will be referred to as "upper" and "lower," respectively. The manufacturing process is roughly classified into Steps 1 through 8. These steps will be described in the order named.

Step 1: Formation of a Fixed Substrate 2

First, a transparent substrate 20 having a light transmittance is prepared as shown in FIG. 4A. The transparent substrate 20 is a base material for a fixed substrate 2. Preferably, a substrate that has a uniform thickness and does not have distortion or defects is used as the transparent substrate 20. A material used for the transparent substrate 20 is not limited to specific one. Examples of the material used for the transparent substrate 20 include various kinds of glasses such as soda glass, crystalline glass, silica glass, lead glass, potassium glass, borosilicate glass, sodium borosilicate glass, and no-alkali glass. For example, it is desirable that the transparent substrate 20 is made of glass containing alkali metal such as sodium (Na). Because these kinds of glasses contain movable ions, it is possible to conduct anodic bonding with silicon (silicon layer 73 described later). Particularly, it is desirable to use a material having a coefficient of thermal expansion substantially equal to that of silicon because the transparent substrate 20 is heated at the time of anodic bonding. Such a material prevents silicon from being warped or bent after bonding. From this point of view, soda glass, potassium glass, borosilicate sodium glass, and the like may be used for the transparent substrate 20. For example, Pyrex™ glass manufactured by Corning Incorporated can suitably be used for the transparent substrate 20.

As shown in FIG. 4B, a mask layer 6 is formed on an upper surface of the transparent substrate 20 (the transparent substrate 20 is masked). Examples of a material used for the mask layer 6 include metal such as Au/Cr, Au/Ti, Pt/Cr, and Pt/Ti, silicon such as polycrystalline silicon (polysilicon) and amorphous silicon, and silicon nitride. When silicon is used for the mask layer 6, adhesiveness can be improved between the mask layer 6 and the transparent substrate 20. When metal is used for the mask layer 6, visibility of the mask layer 6 can be improved. Thickness of the mask layer 6 is not limited to a specific value. Preferably, the mask layer 6 has a thickness to about 0.01 to 1 μm, more preferably to about 0.09 to 0.11 μm. If the mask layer 6 is excessively thin, it may insufficiently protect the transparent substrate 20. If the mask layer 6 is excessively thick, it may be readily peeled off due to internal stress of the mask layer 6. For example, the mask layer 6 may be formed by a chemical vapor deposition (CVD) method, a sputtering method, a vapor phase epitaxy method such as a vapor deposition method, a plating method, or the like.

As shown in FIG. 4C, an opening 63 is formed in the mask layer 6. For example, the opening 63 is formed at a portion at which a second recess 221 is to be formed. The opening 63 has a (plane) shape corresponding to a (plane) shape of the second recess 221 to be formed. For example, the opening 63 can be formed by a photolithography method. Specifically, a resist layer (not shown) having a pattern corresponding to the opening 63 is first formed on the mask layer 6. Then, the mask layer 6 is partially removed while the resist layer serves as a mask. Thereafter, the resist layer is removed. Thus, the opening 63 is formed in the mask layer 6. For example, partial removal of the mask layer 6 may be performed by dry etching with a CF gas, a chlorine-based gas, or the like, or by immersion (wet etching) in a stripping liquid such as a mixed aqueous solution of hydrofluoric acid and nitric acid, a mixed aqueous solution of hydrochloric acid and nitric acid, or an aqueous alkali solution. Such methods can also be applied to removal of a mask layer in the following steps.

As shown in FIG. 4D, a second recess 221 is then formed in the transparent substrate 20. A method of forming the second recess 221 is not limited to specific one. Examples of the method of forming the second recess 221 include etching methods such as a dry etching method and a wet etching method. With an etching method, the transparent substrate 20 is etched through the opening 63 so as to form the second recess 221 having a cylindrical shape. Particularly, with a wet etching method, the second recess 221 can be formed so as to have a shape closer to an ideal cylindrical shape. For example, a hydrofluoric acid based etchant or the like is suitably used as an etchant for wet etching. In this case, when alcohol (particularly polyhydric alcohol) such as glycerin is added to the etchant, the second recess 221 can be formed so as to have a highly smooth surface.

Then, the mask layer 6 is removed. Particularly, the mask layer 6 can efficiently be removed with simple operation by immersion in a solution for removal. Thus, as shown in FIG. 4E, the second recess 221 is formed at a predetermined position in a surface of the transparent substrate 20.

A first recess 211 can be formed and prepared in the same manner as the second recess 221. It is desirable that the first recess 211 and the second recess 221 are formed under different conditions including at least one of an area of an opening to be formed and etching conditions (e.g., etching time, etching temperature, and composition of an etchant). When conditions are partially different between formation of the first recess 211 and formation of the second recess 221, the first recess 211 and the second recess 221 can readily be formed so as to have different diameters.

As a result of the above process, as shown in FIG. 4F, it is possible to produce a fixed substrate 2 having the first recess 211 and the second recess 221 formed at predetermined positions, respectively.

Step 2: Formation of a Drive Electrode 23

Next, as shown in FIG. 4G, a drive electrode 23 is formed on the second recess 221. Examples of a material used for the drive electrode 23 include metal such as Cr, Al, Al alloys, Ni, Zn, Ti, and Au, resin in which carbon or titanium is dispersed, silicon such as polycrystalline silicon (polysilicon) and amorphous silicon, and transparent conductive materials such as ITO. The drive electrode 23 is provided on a bottom of the second recess 221. It is desirable that the drive electrode 23 has a (plane) shape corresponding to a (plane) shape of the formed second recess 221. For example, the drive electrode 23 can be formed by a vapor deposition method, a sputtering method, or an ion plating method. Further, a photolithography method may be combined with these methods. Specifically, a resist layer (not shown) having a pattern corresponding to the drive electrode 23 is formed on the fixed substrate 2. Examples of a material used for the resist layer include Cr, Au, and Cr. Then, the drive electrode 23 is deposited on the second recess 221 while the resist layer serves as a mask. Thus, the drive electrode 23 is formed on the second recess 221.

Step 3: Formation of a Fixed Reflection Film 200

Then, a fixed reflection film 200 is formed at a bottom of the first recess 211. For example, the fixed reflection film 200 may be formed by a photolithography method. Specifically, as shown in FIG. 4H, a resist layer 61 is first formed at predetermined portions of an upper surface of the fixed substrate 2. Then, as shown in FIG. 4I, a reflection film 213 of a multilayer film is formed on the entire upper surface of the fixed substrate 2. For example, the reflection film 213 may be formed by a chemical vapor deposition (CVD) method, a sputtering method, or a vapor phase epitaxy method such as a vapor deposition method, or the like. For example, it is desirable that the multilayer film is made of a material such as silicon oxide ($SiO_2$), tantalum pentoxide ($Ta_2O_5$), or silicon nitride (SiN). These materials can provide a reflection film having an extremely high reflectance or an antireflection film having an extremely low reflectance (an extremely high transmittance). These films are alternately stacked so as to form a multilayer film having a predetermined thickness. By setting (adjusting) thickness of respective layers, the number of layers, and materials of layers, it is possible to form a multilayer film that can transmit or reflect light having a predetermined wavelength (or change characteristics of a multilayer film). For example, a reflectance of a reflection film can be adjusted by setting thickness of respective layers in the reflection film, and a wavelength of light to be reflected on a reflection film can be adjusted by setting the number of layers in the reflection film. Thus, it is possible to readily form a reflection film 213 having desired characteristics.

As shown in FIG. 4J, when the resist layer 61 is removed or stripped (lift-off process), predetermined portions of the reflection film 213 are removed so as to form the fixed reflection film 200 at the bottom of the first recess 211. Thickness of the entire fixed reflection film 200 is not limited to a specific value. Preferably, the fixed reflection film 200 has a thickness of about 0.1 to 12 µm.

In this manufacturing process, it is desirable that the resist layer 61 is not formed on the drive electrode 23. Since the reflection film 213 also serves as an insulating film, an insulating film 220, which prevents short circuit from being caused between the drive electrode 23 and the movable substrate 3, can readily be formed on the drive electrode 23 by removing the resist layer 61.

In the above manner, it is possible to obtain the fixed substrate 2 having the second recess 221 and the first recess 211 formed therein, the drive electrode 23 and the fixed reflection film 200 formed at the predetermined positions on the fixed substrate 2, and the insulating film 220 formed on the drive electrode 23.

Note that Step 3 can also be employed to deposit a movable reflection film 210, an antireflection film 100, and an antireflection film 110. For example, an antireflection ratio (transmittance) of an antireflection film can be adjusted by setting thickness of respective layers in the antireflection film, and a wavelength of light to be transmitted through an antireflection film can be adjusted by setting the number of layers in the antireflection film.

Step 4: Bond of a Wafer (Base Material) 7 and the Fixed Substrate 2

First, a wafer (base material) 7 is prepared as shown in FIG. 4K. It is desirable that the wafer 7 has a characteristic that a surface thereof can be formed as a mirror-finished surface. From this point of view, for example, a silicon-on-insulator (SOI) substrate, a silicon-on-sapphire (SOS) substrate, or the like may be used as the wafer 7. In this example, an SOI substrate is used as the wafer 7. As shown in FIG. 4K, an SOI substrate is formed as a three-layer laminated structure (laminated substrate) having a base layer 71 made of silicon, an $SiO_2$ layer (insulating layer) 72, a silicon layer (active layer) 73, which are stacked in the order named. Among the respective layers of the wafer 7, the base layer 71 and the $SiO_2$ layer 72 are to be removed, and the silicon layer 73 is to be processed into the movable substrate 3. Thickness of the wafer 7 is not limited to a specific value. Particularly, it is desirable that the silicon layer 73 has a thickness of about 10 to 100 μm. The movable substrate 3 can readily be manufactured by using such a wafer 7.

Then, as shown in FIG. 4L, the wafer 7 and the fixed substrate 2 are bonded to each other in a manner such that the silicon layer 73 of the wafer 7 faces the surface of the fixed substrate 2 in which the first recess 211 is formed. For example, the wafer 7 and the fixed substrate 2 can be bonded to each other by an anodic bonding process. For example, the anodic bonding process is performed as follows: First, the fixed substrate 2 is connected to a negative terminal (not shown) of a DC power source while the wafer 7 is connected to a positive terminal (not shown) of the DC power source. The fixed substrate 2 is heated while a voltage is applied between the terminals. Heating of the fixed substrate 2 facilitates movement of $Na^+$. According to the movement of $Na^+$, a bonding surface of the fixed substrate 2 is negatively charged while a bonding surface of the wafer 7 is positively charged. As a result, the fixed substrate 2 and the wafer 7 are firmly bonded to each other. Hereinafter, "anodic bonding" will also be simply referred to as "bonding."

Step 5: Formation of a Movable Substrate 3

Next, as shown in FIG. 4M, the base layer 71 is removed by etching or polishing. For example, wet etching or dry etching may be employed for removal of the base layer 71. Dry etching is preferably used for this purpose. In either case, the $SiO_2$ layer 72 serves as a stopper when the base layer 71 is removed. Because dry etching uses no etchant, the silicon layer 73, which faces the drive electrode 23, is suitably prevented from being damaged. Accordingly, it is possible to enhance a yield of manufacturing optical tunable filters.

First, a wet etching process will be described. The wafer 7 and the fixed substrate 2 that are bonded to each other are immersed, for example, in a KOH solution having a concentration of about 1 to 40 weight %, preferably about 10 weight %. A reaction formula of this etching process is represented by

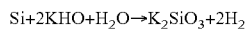
$$Si+2KHO+H_2O \rightarrow K_2SiO_3+2H_2$$

With use of the KOH solution, an etching rate of the base layer 71 is considerably higher than an etching rate of the $SiO_2$ layer 72. Accordingly, the $SiO_2$ layer 72 serves as a stopper for the etching process. In addition to the KOH solution, examples of the etchant used in this etching process include a tetraethylammonium hydroxide (TMAH) solution, an ethylenediamine-pyrocatechol-diazine (EPD) solution, and a hydrazine solution. According to the wet etching process, batch processing can be conducted so as to improve productivity.

Next, a dry etching process will be described. The wafer 7 and the fixed substrate 2 that are bonded to each other are introduced into a chamber, which is supplied, for example, with $XeF_2$ having a pressure of 390 Pa for 60 seconds. A reaction formula of this etching process is represented by

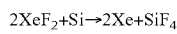
$$2XeF_2+Si \rightarrow 2Xe+SiF_4$$

With the dry etching process using $XeF_2$, an etching rate of the base layer 71 is considerably higher than an etching rate of the $SiO_2$ layer 72. Accordingly, the $SiO_2$ layer 72 serves as a stopper for the etching process. Since this etching process does not employ plasma, portions other than portions to be removed are unlikely to be damaged. For example, plasma etching with $CF_4$ or $SF_6$ may be used instead of etching with $XeF_2$.

Any known polishing methods may be used to remove the base layer 71, and an explanation of such methods is omitted.

In the above manner, the base layer 71 can suitably be removed from the wafer 7.

Then, as shown in FIG. 4N, the $SiO_2$ layer 72 is etched and removed from the wafer 7. It is desirable to use an etchant containing hydrofluoric acid to etch the $SiO_2$ layer 72. Such an etchant can suitably remove the $SiO_2$ layer 72.

Thereafter, a resist layer (not shown) having a pattern corresponding to (plane) shapes of a movable portion 31 and support portions 32 is formed on the silicon layer 73. The wafer 7 is then etched by a dry etching method, particularly an inductively coupled plasma etching (ICP) method. As a result, as shown in FIG. 4O, it is possible to produce a movable substrate 3 having a movable portion 31 with an opening 311, support portions 32, and a fixed portion 33.

In this example, an ICP etching process is performed. Specifically, etching with an etching gas and formation of a protective film with a deposition gas are alternately performed repeatedly to form the movable portion 31 and the support portions 32. Examples of the etching gas include $SF_6$, and examples of the deposition gas include $C_4F_8$. As a result, only the silicon layer 73 can be etched. Further, by using a dry etching process, the movable portion 31, the support portions 32, and the fixed portion 33 can reliably be formed accurately without adverse influences on other portions.

As described above, a dry etching process, particularly an ICP etching process, is employed to form the movable portion 31, the support portions 32, and the fixed portion 33. Accordingly, the movable portion 31, in particular, can reliably be formed with ease and accuracy.

The movable portion 31, the support portions 32, and the fixed portion 33 may be formed by other dry etching processes such as a reactive ion etching (RIE) process. Further, the movable portion 31, the support portions 32, and the fixed portion 33 may be formed by any process other than a dry etching process.

Step 6: Formation of a Movable Reflection Film 210 on a Light-Transmittable Substrate 4

Next, a light-transmittable substrate 4 is prepared as shown in FIG. 4P. Examples of a material used for the light-transmittable substrate 4 include the same materials as described for the transparent substrate 20.

Then, as shown in FIG. 4Q, a movable reflection film 210 is formed on an upper surface of the light-transmittable substrate 4. The movable reflection film 210 has a (plane) shape corresponding to the shape of the opening 311 of the movable portion 31.

Step 7: Bond of the Light-Transmittable Substrate 4 to the Movable Portion 31

Next, as shown in FIG. 4R, the light-transmittable substrate 4 is bonded to the movable portion 31 so as to cover the opening 311 in a state such that the movable reflection film 210 and the fixed reflection film 200 face each other. Thus, the movable reflection film 210 is located within the opening 311.

Step 8: Formation of Antireflection Films 100 and 110

Thereafter, an antireflection film 100 is formed on a lower surface of the fixed substrate 2, and an antireflection film 110 is formed on an upper surface of the light-transmittable substrate 4. Timing of forming the antireflection film 100 is not specifically limited. The antireflection film 100 may be formed at desired timing before Step 8.

According to the above steps, it is possible to obtain an optical tunable filter 1 as shown in FIGS. 1 and 2.

As described above, according to a method of manufacturing an optical tunable filter 1 of the present invention, since the movable reflection film 210 is formed on the surface of the light-transmittable substrate 4, the thickness of the movable reflection film 210 can reliably be controlled with ease. Accordingly, coherent light emitted from the interference gap 21 is reliably prevented from being attenuated due to non-uniformity of the thickness of the movable reflection film 210.

Further, since the movable substrate 3 is made of silicon, the movable portion 31, the support portions 32, and the fixed portion 33 can be formed integrally with each other so as to simplify a manufacturing process of the optical tunable filter 1.

Furthermore, since the drive gap 22 and the interference gap 21 are formed in the fixed substrate 2 (i.e., in the same substrate), it is possible to simplify a manufacturing process of the optical tunable filter 1.

Additionally, a step for releasing a sacrifice layer is not required to manufacture an optical tunable filter 1. Therefore, it is not necessary to form a release hole in the movable portion 31. Thus, it possible to simplify a manufacturing process of the movable portion 31. Since an area of a portion of the movable portion 31 (of the movable substrate 3) to which Coulomb forces are applied is not reduced, it is possible to reduce a voltage to be applied between the movable portion 31 and the drive electrode 23.

In the present embodiment, since the antireflection film 100, the movable reflection film 210, and the fixed reflection film 200 are formed of insulating films, the movable portion 31 and the drive electrode 23 are prevented from being stuck on each other, i.e., sticking is prevented. Thus, it is possible to form a reliable insulating structure.

In addition to the effects described above, the optical tunable filter 1 shown in FIGS. 1 and 2 is also advantageous in that it can be manufactured at a relatively low cost.

Second Embodiment

Figure 5:
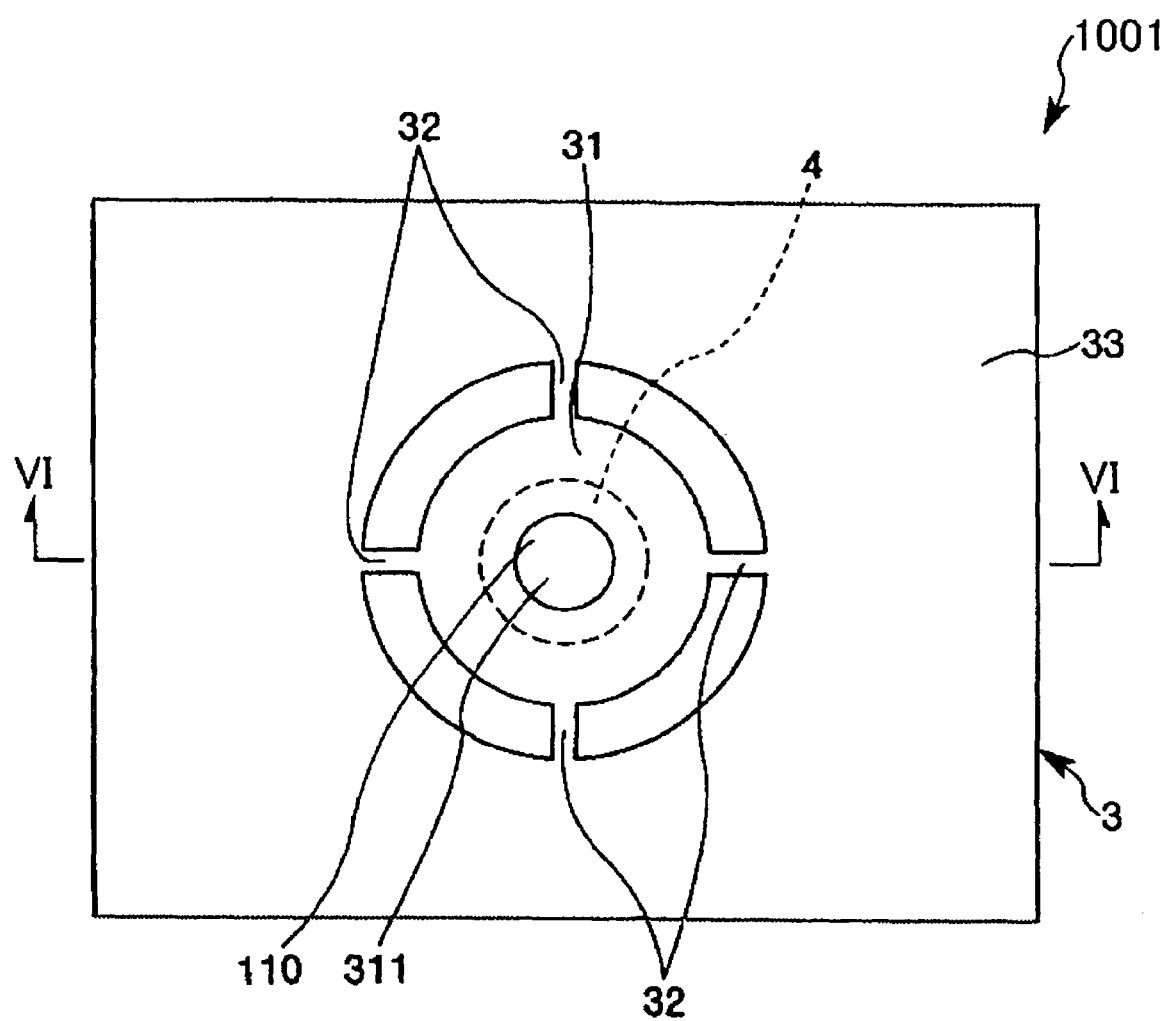
FIG. 5 is a plan view showing an optical tunable filter according to a second embodiment of the present invention.
Figure 6:
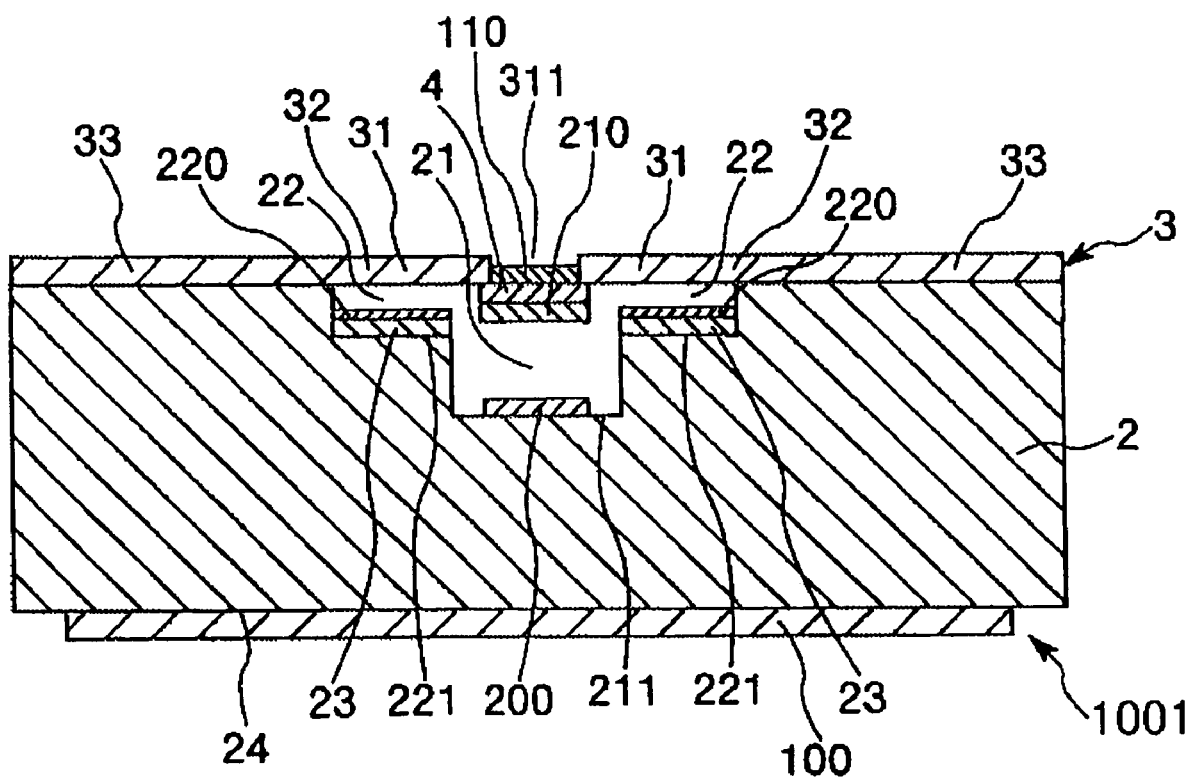
FIG. 6 is a cross-sectional view taken along line VI-VI in FIG. 5.

An optical tunable filter according to a second embodiment of the present invention will be described. FIG. 5 is a plan view (top view) showing an optical tunable filter 1001 according to the second embodiment of the present invention. FIG. 6 is a cross-sectional view taken along line VI-VI in FIG. 5. The following description of the optical tunable filter 1001 in the second embodiment is mainly focused on differences between the second embodiment and the first embodiment. Similar portions will not be described repetitively.

The optical tunable filter 1001 of the second embodiment is different from the optical tunable filter 1 of the first embodiment in that a light-transmittable substrate 4 is bonded to (provided on) a movable portion 31 at a different location than that in the first embodiment. As shown in FIGS. 5 and 6, in the optical tunable filter 1001 of the second embodiment, the light-transmittable substrate 4 is bonded to (provided on) a surface (lower surface in FIG. 6) of the movable portion 31 which faces a bottom of a first recess 211. An antireflection film 110 is provided within an opening 311 formed in the movable portion 31. Specifically, as viewed in a thickness direction of the optical tunable filter 1001 (in a vertical direction in FIG. 6), the entire movable reflection film 110 is located in the opening 311.

The optical tunable filter 1001 of the second embodiment also has the same advantageous effects as those in the optical tunable filter 1 of the first embodiment. Further, the optical tunable filter 1001 can be made compact in size. Furthermore, since a movable reflection film 210 also serves as an insulating film, it is not necessary to provide an insulating film separately. Thus, the optical tunable filter 1001 can have a simplified structure.

A method of manufacturing an optical tunable filter 1001 of the second embodiment will be described below. The following description is mainly focused on differences between a method in the second embodiment and the method in the first embodiment. Similar portions will not be described repetitively.

FIGS. 7A through 7D are diagrams explanatory of a method of manufacturing an optical tunable filter 1001 according to the second embodiment. The method of manufacturing the optical tunable filter 1001 according to the second embodiment is the same as the method of manufacturing the optical tunable filter 1 according to the first embodiment except for Step 4 and its subsequent steps. Thus, Step 4 and its subsequent steps will be described below.

Step 4: Formation of a Movable Reflection Film 210 on a Light-Transmittable Substrate 4

Figure 7A:
FIGS. 7A through 7D are diagrams explanatory of a method of manufacturing an optical tunable filter according to the second embodiment.
Figure 7B:
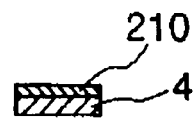

First, a light-transmittable substrate 4 is prepared as shown in FIG. 7A. Then, as shown in FIG. 7B, a movable reflection film 210 is formed on an upper surface of the light-transmittable substrate 4.

Step 5: Bond of a Wafer (Base Material) 7 and the Light-Transmittable Substrate 4

Figure 7C:
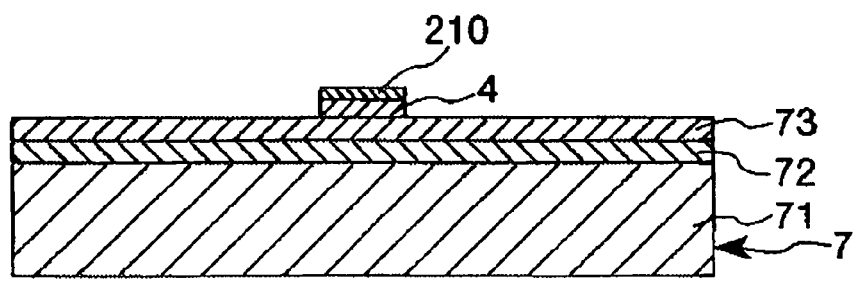

Next, as shown in FIG. 7C, the light-transmittable substrate 4 is bonded to a silicon layer 73 of the wafer 7 at a position corresponding to a portion to be the opening 311 in a manner such that the movable reflection film 210 is located on an opposite side of the light-transmittable substrate 4 to the wafer 7.

Step 6: Bond of the Wafer 7 and the Fixed Substrate 2

Figure 7D:
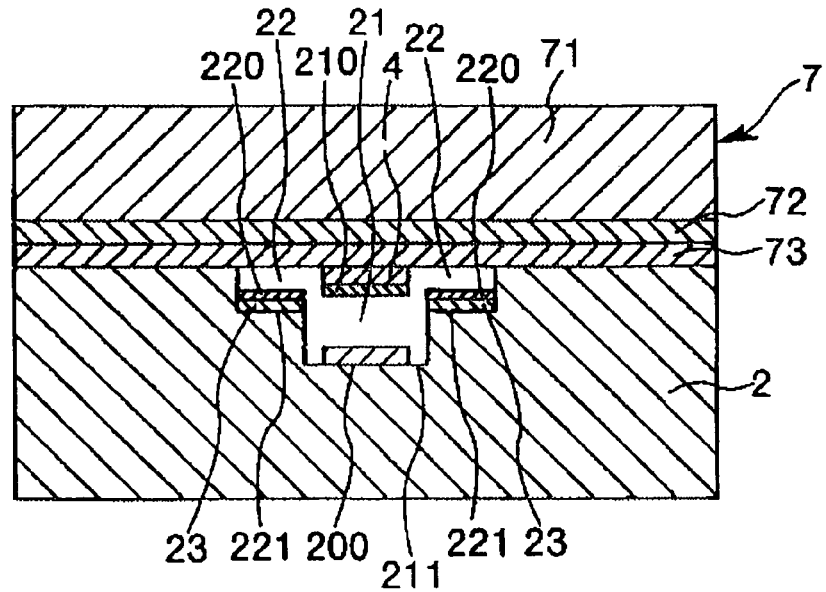

Then, as shown in FIG. 7D, the wafer 7 and the fixed substrate 2 are bonded to each other in a manner such that the movable reflection film 210 faces a fixed reflection film 200.

Step 7: Formation of a Movable Substrate 3

Next, a movable substrate 3 is formed from the wafer 7 in the same manner as Step 5 in the first embodiment.

Step 8: Formation of Antireflection Films 100 and 110

Then, an antireflection film 100 and an antireflection film 110 are formed in the same manner as Step 8 in the first embodiment.

With the aforementioned steps, it is possible to manufacture an optical tunable filter 1001 of the second embodiment as shown in FIGS. 5 and 6.

Third Embodiment

Figure 8:
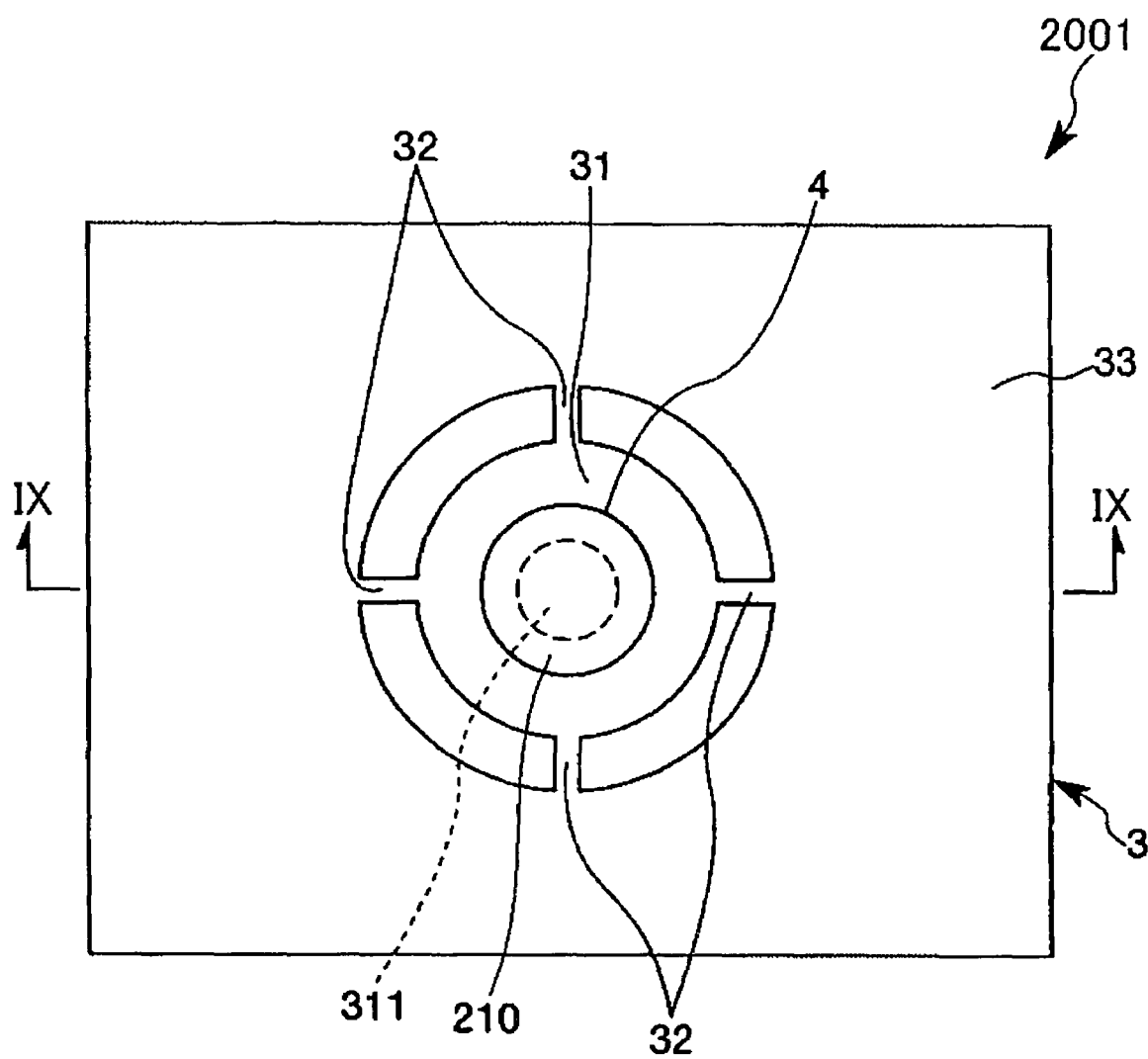
FIG. 8 is a plan view showing an optical tunable filter including a movable substrate and a light-transmittable substrate according to a third embodiment of the present invention.
Figure 9:
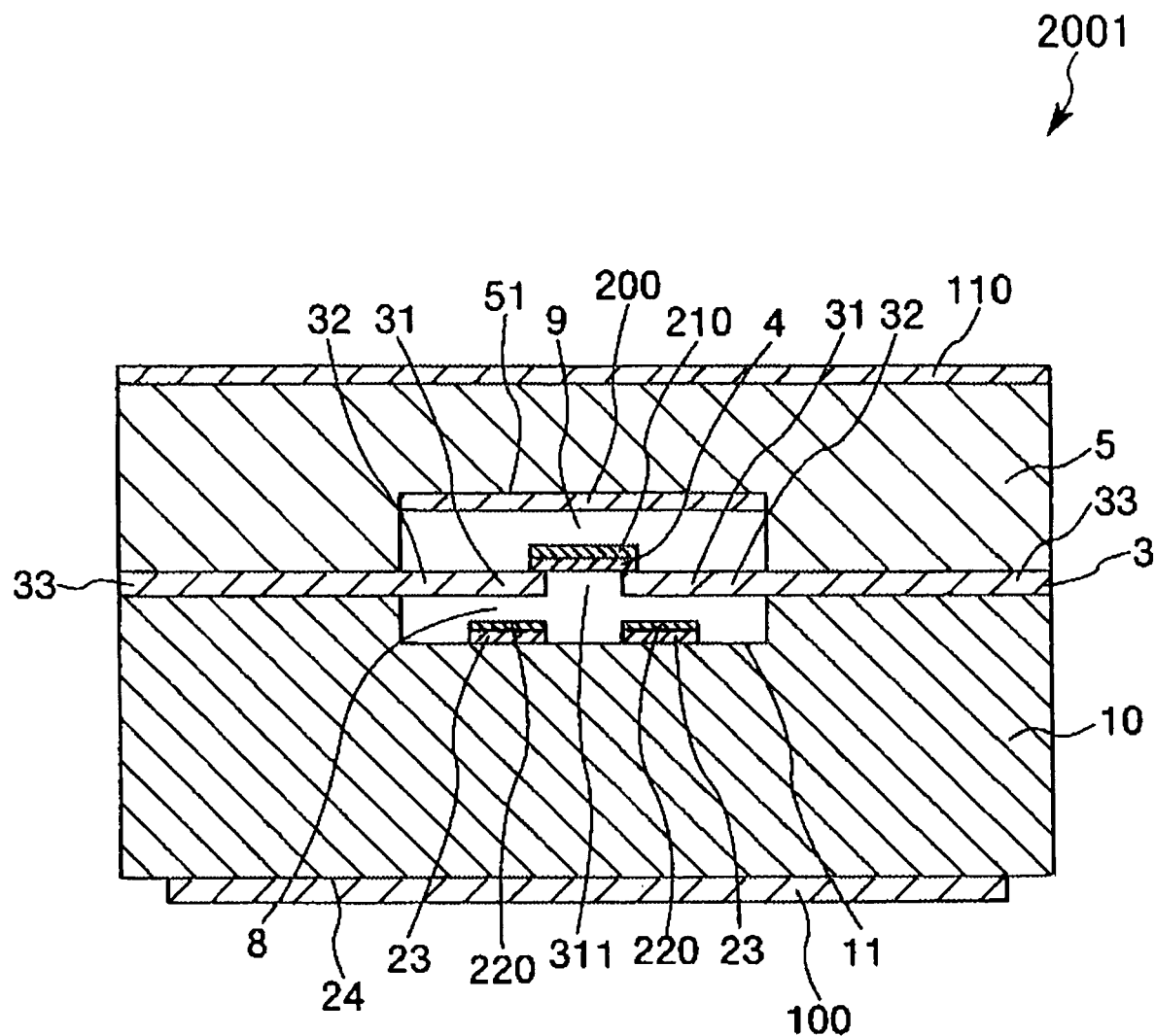
FIG. 9 is a cross-sectional view taken along line IX-IX in FIG. 8.
Figure 10:
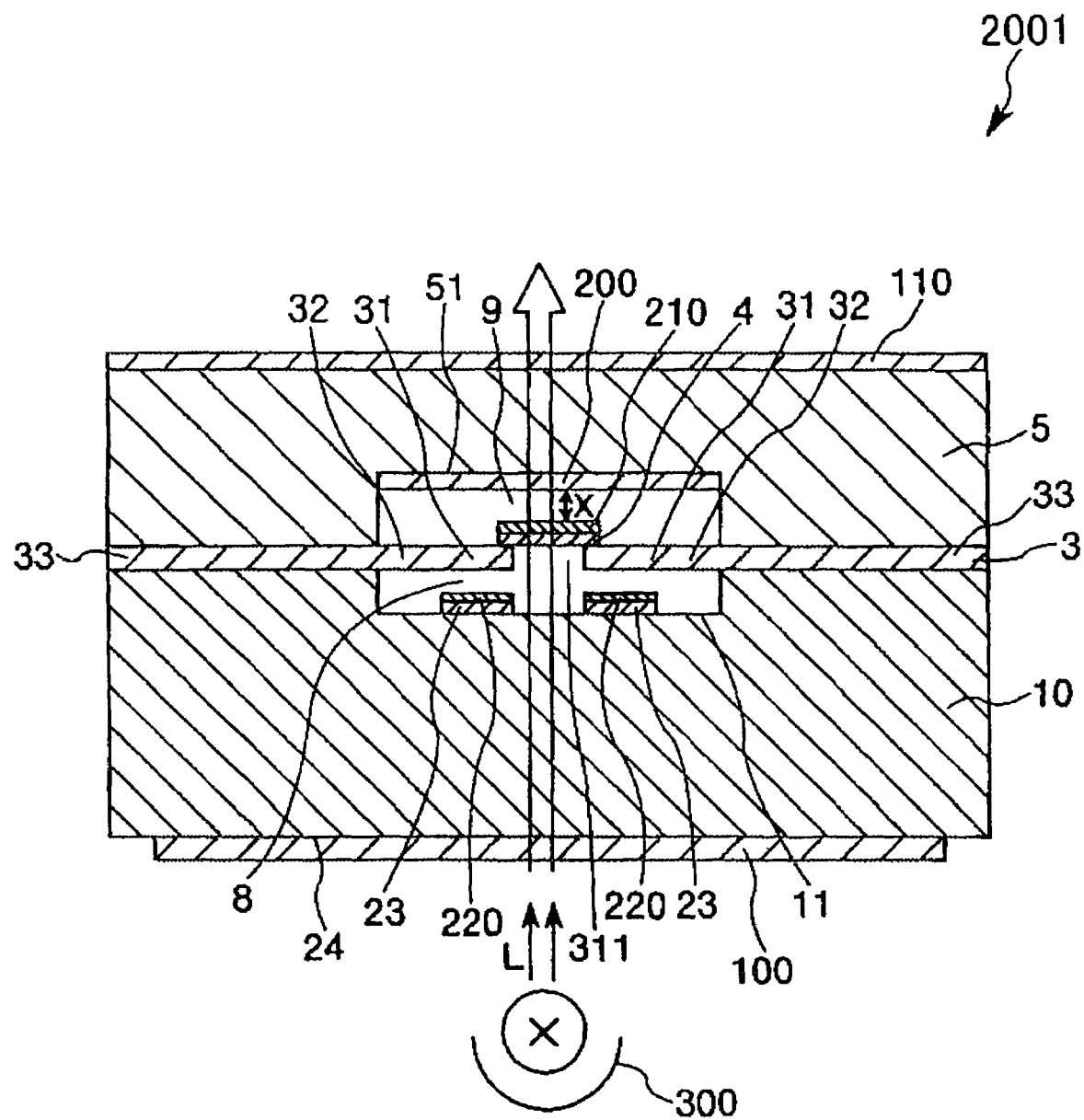
FIG. 10 is a diagram explanatory of an operation of the optical tunable filter shown in FIG. 8.

An optical tunable filter according to a third embodiment of the present invention will be described. FIG. 8 is a plan view (top view) showing an optical tunable filter 2001 including a movable substrate 3 and a light-transmittable substrate 4 according to the third embodiment of the present invention. FIG. 9 is a cross-sectional view taken along line IX-IX in FIG. 8. FIG. 10 is a diagram explanatory of an operation of the optical tunable filter 2001. In the following explanation, upper and lower sides in FIG. 9 will be referred to as "upper" and "lower," respectively.

For example, the optical tunable filter 2001 serves as a device for receiving light and emitting light (coherent light) corresponding to a predetermined frequency. As shown in FIG. 9, the optical tunable filter 2001 includes a first fixed substrate 10 having a light transmittance, a movable substrate 3 facing the first fixed substrate 10, a light-transmittable substrate 4 having a light transmittance, and a second fixed substrate 5 having a light transmittance. The movable substrate 3 has an electric conductivity.

The movable substrate 3 is made of silicon (Si). As shown in FIG. 8, the movable substrate 3 includes a movable portion 31 centrally arranged in the movable substrate 3, support portions 32 for supporting the movable portion 31 in a state such that the movable portion 31 can be displaced (moved) in a vertical direction in FIG. 9, and a fixed portion 33. The movable portion 31 has a substantially circular shape in a plan view. The movable substrate 3 is fixed (bonded) to the second fixed substrate 5 on an upper surface of the fixed portion 33 as shown in FIG. 9. The movable substrate 3 is also fixed (bonded) to the first fixed substrate 10 on a lower surface of the fixed portion 33 as shown in FIG. 9.

The movable portion 31 includes an opening 311 having a substantially circular shape in a plan view. The opening 311 is formed concentrically with a circle forming the movable portion 31. The shapes of the movable portion 31 and the opening 311 are not limited to specific examples shown in FIGS. 8 and 9. Preferably, the opening 311 has substantially a similar shape to the movable portion 31. Thickness (average thickness) of the movable portion 31 is appropriately selected according to a material used for the movable portion 31, an application thereof, and the like and is not limited to a specific value. Preferably, the movable portion 31 has a thickness of about 1 to 500 µm, more preferably about 10 to 100 µm. When the movable portion 31 has a thickness within the above range, it has an improved driving efficiency. Driving operation of the movable portion 31 will be described later.

The movable substrate 3 has four support portions 32, 32, 32, 32 formed integrally with the movable portion 31 and the fixed portion 33, respectively, near the center of FIG. 8. Each support portion 32 has elasticity (flexibility) and serves to support the movable portion 31 so that the movable portion 31 can be displaced. Thus, the movable portion 31 is connected to the fixed portion 33 via the respective support portions 32. The support portions 32 are arranged on an outer circumferential surface of the movable portion 31 at equal angular intervals (intervals of 90°) with openings interposed between adjacent support portions 32. The number of the support portions 32 is not limited to four. For example, one, two, three, five or more support portions 32 may be provided. Further, the shape of the support portions 32 is not limited to the illustrated example.

The first fixed substrate 10 has a recess 11 formed below the opening 311 (so as to face the opening 311). This recess 11 serves as a first recess according to the present invention. The recess 11 has an outside shape corresponding to an outside shape of the movable portion 31. In the present embodiment, the recess 11 has a substantially circular shape in a plan view. The recess 11 has a dimension slightly larger than that of the movable portion 31.

The recess 11 forms a drive gap 8 in a space thereof. Specifically, the movable portion 31 and the recess 11 define the drive gap 8. Thickness (average thickness) of the drive gap 8 is appropriately selected according to an application of the drive gap 8 and the like and is not limited to a specific value. Preferably, the drive gap 8 has a thickness of about 0.5 to 20 µm.

For example, it is desirable that the first fixed substrate 10 is made of glass, preferably glass containing alkali metal. Thickness (average thickness) of the first fixed substrate 10 is appropriately selected according to a material used for the first fixed substrate 10, an application thereof, and the like and is not limited to a specific value. Preferably, the first fixed substrate 10 has a thickness of about 10 to 2000 µm, more preferably about 100 to 1000 µm.

The optical tunable filter 2001 has a drive electrode 23 disposed on a bottom of the recess 11. The drive electrode 23 has an electric conductivity. The drive electrode 23 is configured to apply a voltage to the optical tunable filter 2001 from an exterior of the optical tunable filter 2001 via a conductive layer (not shown). Thickness (average thickness) of the drive electrode 23 is appropriately selected according to a material used for the drive electrode 23, an application thereof, and the like and is not limited to a specific value. Preferably, the drive electrode 23 has a thickness of about 0.1 to 5 µm. The drive electrode 23, the drive gap 8, and a peripheral portion of the movable portion 31 form a main portion of a driving unit (actuator) to drive the movable portion 31 with Coulomb forces. Insulating treatment is performed on a surface of the drive electrode 23 to form an insulating film 220 having insulating properties.

The light-transmittable substrate 4 allows infrared light and light having a wavelength shorter than that of infrared light to pass therethrough. The light-transmittable substrate 4 is bonded to the movable portion 31 at a location near the opening 311. Specifically, the light-transmittable substrate 4 is bonded to (provided on) a surface (upper surface in FIG. 9) of the movable portion 31 which faces the second fixed substrate 5. The light-transmittable substrate 4 covers the entire area of the opening 311. For example, it is desirable that the light-transmittable substrate 4 is made of the same material as the first fixed substrate 10. Thickness (average thickness) of the light-transmittable substrate 4 is appropriately selected according to a material used for the light-transmittable substrate 4, an application thereof, and the like and is not limited to a specific value. Preferably, the light-transmittable substrate 4 has a thickness of about 100 to 1000 µm, more preferably about 100 to 500 µm.

The optical tunable filter 2001 has a movable reflection film (HR coat) 210 disposed on a surface (upper surface in FIG. 9) of the light-transmittable substrate 4 which faces the second fixed substrate 5. The movable reflection film 210 can efficiently reflect light. The movable reflection film 210 is formed on the light-transmittable substrate 4 so as to have uniform thickness (film thickness). The movable reflection film 210 is formed of a multilayer film having insulating properties. Specifically, the movable reflection film 210 also serves as an insulating film.

The second fixed substrate 5 is bonded to a surface of the movable substrate 3 which is opposite to the first fixed substrate 10. The second fixed substrate 5 has a recess 51 facing the opening 311. This recess 51 serves as a second recess according to the present invention. The recess 51 has an outside shape corresponding to the outside shape of the movable portion 31. In the present embodiment, the recess 51 has a substantially circular shape in a plan view. The recess 51 has a dimension slightly larger than that of the movable portion 31.

The movable portion 31 is housed in a space defined by the recess 51 of the second fixed substrate 5 and the recess 11 of the first fixed substrate 10. This space forms a closed space (sealed space). For example, it is desirable that the second fixed substrate 5 is made of the same material as the first fixed substrate 10.

Thickness (average thickness) of the second fixed substrate 5 is appropriately selected according to a material used for the second fixed substrate 5, an application thereof, and the like and is not limited to a specific value. Preferably, the second fixed substrate 5 has a thickness of about 10 to 2000 μm, more preferably about 100 to 500 μm.

The optical tunable filter 2001 has a fixed reflection film (HR coat) 200 disposed on a bottom of the recess 51. The fixed reflection film 200 has insulating properties and efficiently reflects light. For example, the fixed reflection film 200 is formed of a multilayer film as with the movable reflection film 210. The fixed reflection film 200 is arranged so as to overlap at least the entire opening 311 in a plan view. (When the fixed reflection film 200 is projected on the movable substrate 3, the projection is located on a portion corresponding to the opening 311 and its vicinity). The fixed reflection film 200 is disposed so as to face the movable reflection film 210 with an interference gap 9 interposed between the fixed reflection film 200 and the movable reflection film 210. The interference gap 9 is defined between the fixed reflection film 200 and the movable reflection film 210. Specifically, the movable portion 31 and the recess 51 define the interference gap 9.

Thickness (average thickness) of the first fixed substrate 10 is appropriately selected according to a material used for the first fixed substrate 10, an application thereof, and the like and is not limited to a specific value. Preferably, the first fixed substrate 10 has a thickness of about 10 to 2000 μm, more preferably about 100 to 1000 μm. Thickness (average thickness) of the interference gap 9 is appropriately selected according to an application of the interference gap 9 and the like and is not limited to a specific value. Preferably, the interference gap 9 has a thickness of about 1 to 100 μm.

As shown in FIG. 9, the first fixed substrate 10 has a lower surface forming a light incident portion 24. The light incident portion 24 is adapted to introduce external light into the conductivity 9 via the first fixed substrate 10. The optical tunable filter 2001 includes an antireflection film (AR coat) 100 on a surface of the light incidence portion 24, i.e., a surface of the first fixed substrate 2 opposite to the recess 11. The antireflection film 100 serves to regulate reflection of external light (incident light). The optical tunable filter 2001 also includes an antireflection film 110 formed on an upper surface of the second fixed substrate 5, i.e., a surface of the second fixed substrate 5 opposite to the recess 51. The antireflection film 110 also serves to regulate reflection of external light (incident light).

With the optical tunable filter 2001 thus constructed, when a voltage is applied between the conductive layer and the fixed portion 33, the drive electrode 23 and the movable portion 31 are charged in opposite polarities to produce a potential difference therebetween. As a result, Coulomb forces (electrostatic forces) are produced between the drive electrode 23 and the movable portion 31. The attraction due to Coulomb forces is utilized to displace the movable portion 31 through the drive gap 8 in a direction in which the interference gap 9 is increased. Accordingly, the movable portion 31 is displaced relative to the first fixed substrate 10 (downwardly in FIG. 9) and comes to a standstill.

In this case, for example, when an applied voltage is varied continuously or gradually, the movable portion 31 can be moved to a predetermined position in the vertical direction. Accordingly, a distance x of the interference gap 9 can be adjusted (changed) to a predetermined value. Thus, it is possible to emit light (coherent light) having a predetermined wavelength.

Operations (effects) of an optical tunable filter according to the present invention will be described with reference to FIG. 10.

As shown in FIG. 10, light L emitted from a light source 300 is introduced into the optical tunable filter 2001 from the light incident portion 24. Specifically, the light L passes through the antireflection film 100, the first fixed substrate 10, the opening 311, the light-transmittable substrate 4, and the movable reflection film 210 into the interference gap 9. The light L introduced into the interference gap 9 is repeatedly reflected between the fixed reflection film 200 and the movable reflection film 210 to thereby cause interference. In this case, the fixed reflection film 200 and the movable reflection film 210 can reduce a loss of the light L. As a result of the interference of the light L, light having a wavelength corresponding to the distance x, which is hereinafter referred to as "coherent light," is allowed to pass through the fixed reflection film 200. Thus, the coherent light is emitted via the second fixed substrate 5 and the antireflection film 110 to an exterior of the optical tunable filter 2001.

As described above, according to the optical tunable filter 2001, coherent light is emitted via the opening 311 and the light-transmittable substrate 4. Accordingly, it is possible to separate not only infrared light but also light having a specific wavelength shorter than that of infrared light, such as ultraviolet light or visible light.

Further, since the movable reflection film 210 is provided on the light-transmittable substrate 4, the movable reflection film 210 can have a uniform thickness (film thickness). Thus, the movable reflection film 210 has high planarity. Accordingly, the coherent light emitted from the optical tunable filter 2001 is reliably prevented from being attenuated.

Furthermore, since the insulating film 220 is formed on the surface of the drive electrode 23, it is possible to prevent short circuit which would be caused when the drive electrode 23 and the movable portion 31 are brought into contact with each other. Accordingly, it is possible to remarkably improve reliability of the optical tunable filter 2001.

The antireflection film 100 and the antireflection film 110 can reduce reflection of light introduced into the optical tunable filter 2001 and reflection of coherent light interfering in the interference gap 9. Accordingly, the optical tunable filter 2001 can efficiently transmit light.

In the present embodiment, since the movable portion 31 has a substantially circular shape in a plan view, it is possible to efficiently drive the movable portion 31.

A method of manufacturing an optical tunable filter according to the present invention will be described below by using an optical tunable filter 2001 shown in FIG. 8 as an example.

Figure 11A:
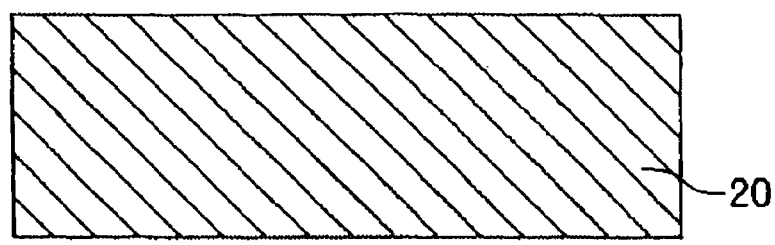
FIGS. 11A through 11S are diagrams explanatory of a method of manufacturing an optical tunable filter according to the third embodiment.
Figure 11B:
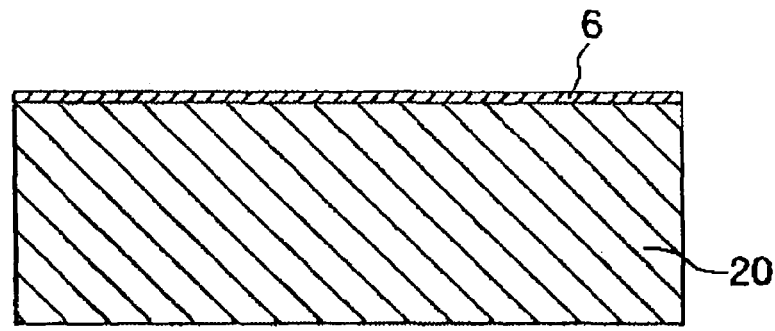
Figure 11C:
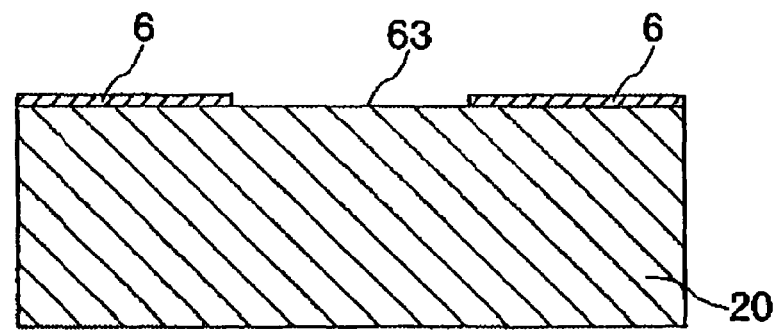
Figure 11D:
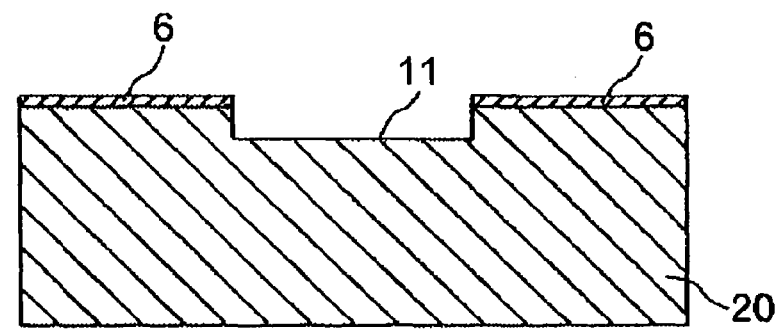
Figure 11E:
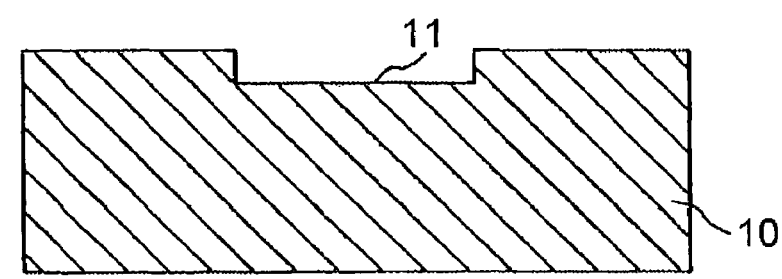
Figure 11F:
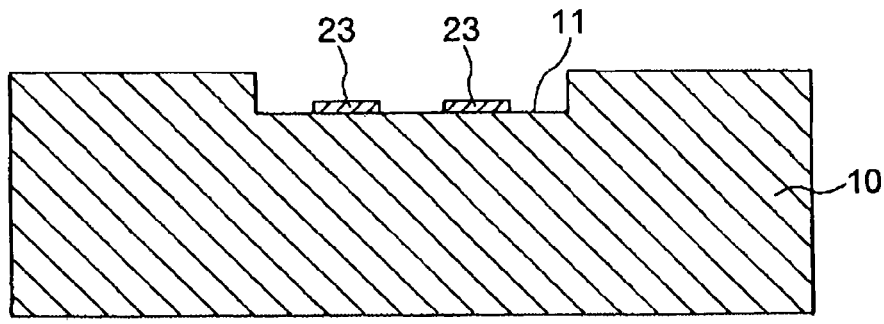
Figure 11G:
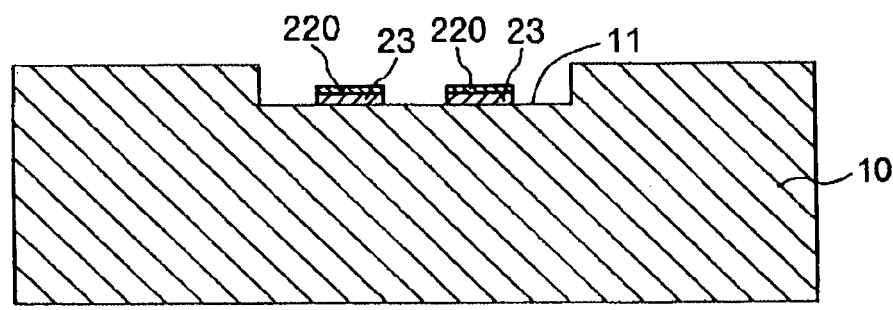
Figure 11H:
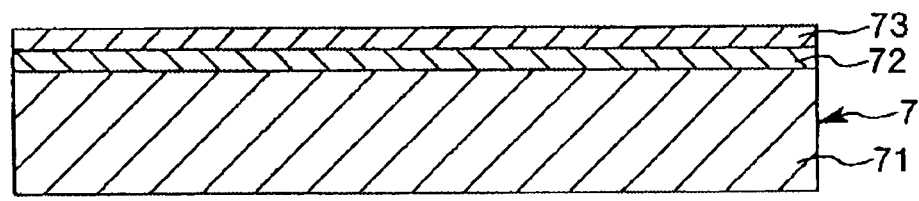
Figure 11I:
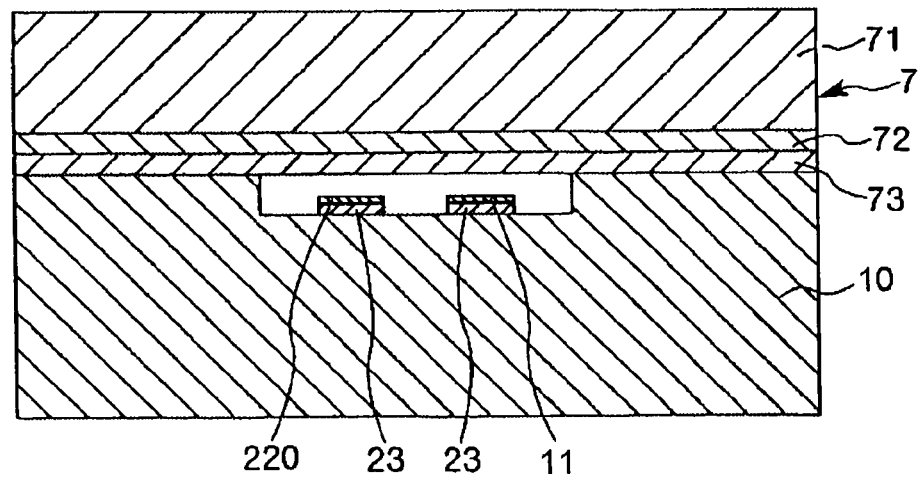
Figure 11J:
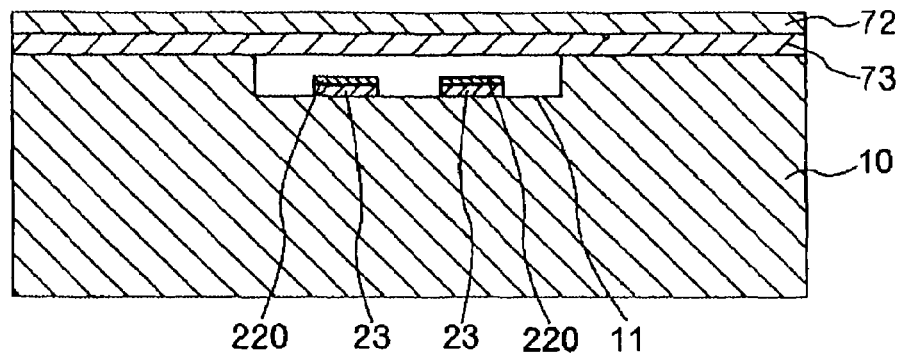
Figure 11K:
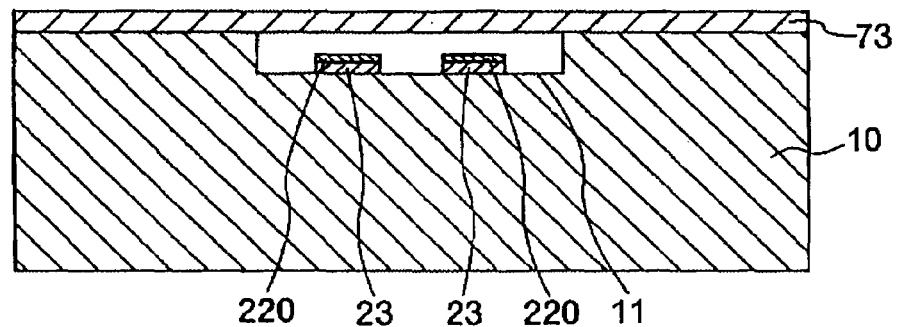
Figure 11L:
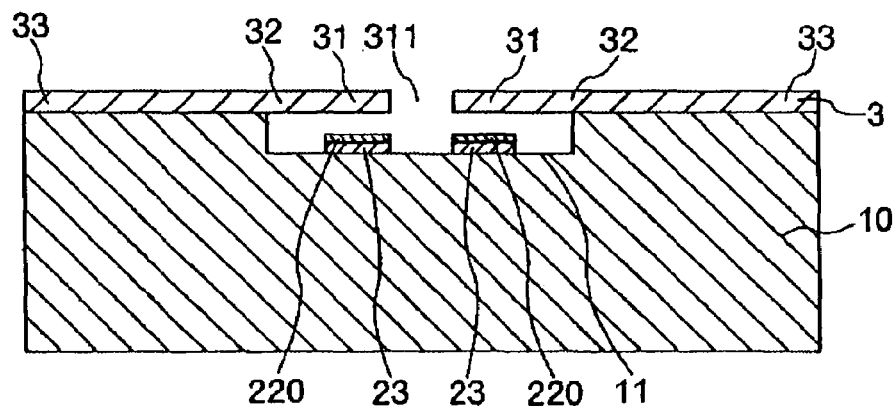
Figure 11M:
Figure 11N:
Figure 11O:
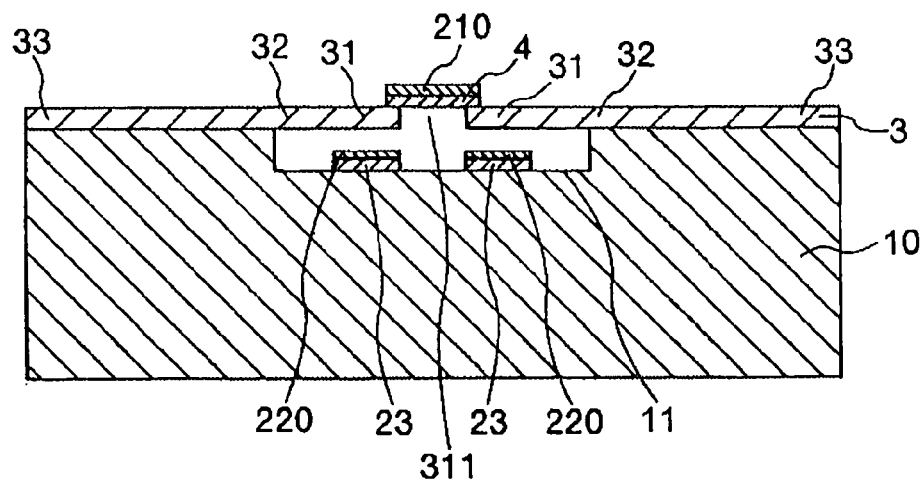
Figure 11P:
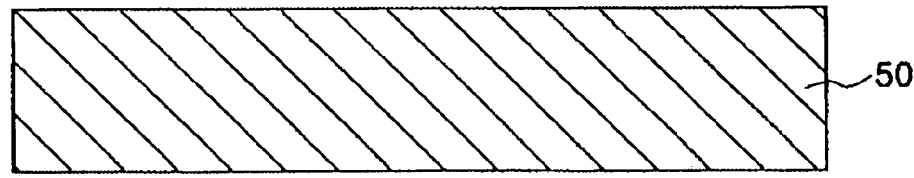
Figure 11Q:
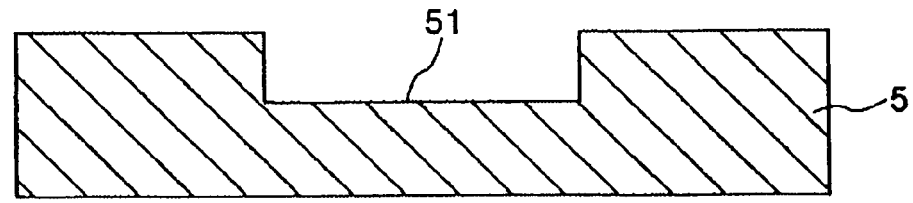
Figure 11R:
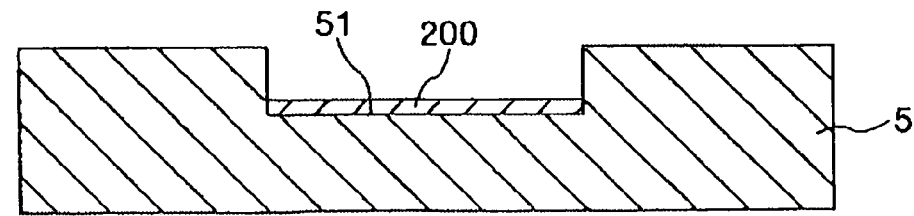
Figure 11S:
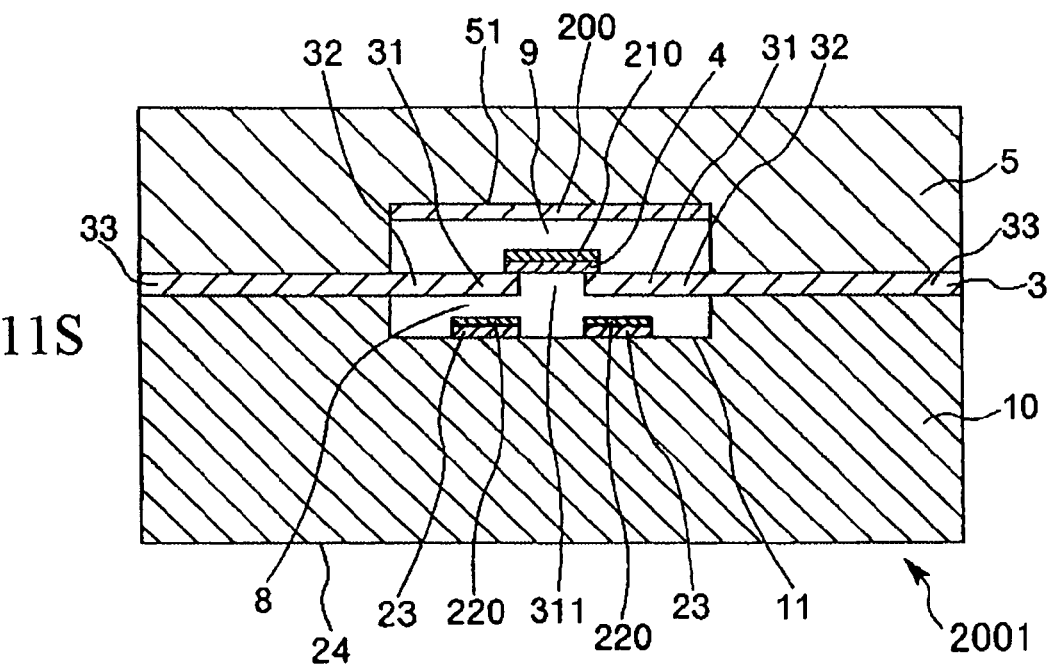

FIGS. 11A through 11S are diagrams explanatory of a method of manufacturing an optical tunable filter according to the third embodiment (diagrams schematically showing a manufacturing process). In the following description, upper and lower sides in FIGS. 11A through 11S will be referred to as "upper" and "lower," respectively. The manufacturing process is roughly classified into Steps 1 through 10. These steps will be described in the order named.

Step 1: Formation of a First Fixed Substrate 10

First, a transparent substrate 20 having a light transmittance is prepared as shown in FIG. 11A. The transparent substrate 20 is a base material for a first fixed substrate 10. Preferably, a substrate that has a uniform thickness and does not have distortion or defects is used as the transparent substrate 20. A material used for the transparent substrate 20 is not limited to specific one. Examples of the material used for the transparent substrate 20 include various kinds of glasses such as soda glass, crystalline glass, silica glass, lead glass, potassium glass, borosilicate glass, sodium borosilicate glass, and no-alkali glass. For example, it is desirable that the transparent substrate 20 is made of glass containing alkali metal such as sodium (Na). Because these kinds of glasses contain movable ions, it is possible to conduct anodic bonding with silicon (silicon layer 73 described later). Particularly, it is desirable to use a material having a coefficient of thermal expansion substantially equal to that of silicon because the transparent substrate 20 is heated at the time of anodic bonding. Such a material prevents silicon from being warped or bent after bonding. From this point of view, soda glass, potassium glass, borosilicate sodium glass, and the like may be used for the transparent substrate 20. For example, Pyrex™ glass manufactured by Corning Incorporated can suitably be used for the transparent substrate 20.

As shown in FIG. 11B, a mask layer 6 is formed on an upper surface of the transparent substrate 20 (the transparent substrate 20 is masked). Examples of a material used for the mask layer 6 include metal such as Au/Cr, Au/Ti, Pt/Cr, and Pt/Ti, silicon such as polycrystalline silicon (polysilicon) and amorphous silicon, and silicon nitride. When silicon is used for the mask layer 6, adhesiveness can be improved between the mask layer 6 and the transparent substrate 20. When metal is used for the mask layer 6, visibility of the mask layer 6 can be improved. Thickness of the mask layer 6 is not limited to a specific value. Preferably, the mask layer 6 has a thickness to about 0.01 to 1 μm, more preferably to about 0.09 to 0.11 μm. If the mask layer 6 is excessively thin, it may insufficiently protect the transparent substrate 20. If the mask layer 6 is excessively thick, it may be readily peeled off due to internal stress of the mask layer 6. For example, the mask layer 6 may be formed by a chemical vapor deposition (CVD) method, a sputtering method, a vapor phase epitaxy method such as a vapor deposition method, a plating method, or the like.

As shown in FIG. 11C, an opening 63 is formed in the mask layer 6. For example, the opening 63 is formed at a portion at which a recess 11 is to be formed. The opening 63 has a (plane) shape corresponding to a (plane) shape of the recess 11 to be formed. For example, the opening 63 can be formed by a photolithography method. Specifically, a resist layer (not shown) having a pattern corresponding to the opening 63 is first formed on the mask layer 6. Then, the mask layer 6 is partially removed while the resist layer serves as a mask. Thereafter, the resist layer is removed. Thus, the opening 63 is formed in the mask layer 6. For example, partial removal of the mask layer 6 may be performed by dry etching with a CF gas, a chlorine-based gas, or the like, or by immersion (wet etching) in a stripping liquid such as a mixed aqueous solution of hydrofluoric acid and nitric acid, a mixed aqueous solution of hydrochloric acid and nitric acid, or an aqueous alkali solution. Such methods can also be applied to removal of a mask layer in the following steps.

As shown in FIG. 1D, a recess 11 is formed in the transparent substrate 20. A method of forming the recess 11 is not limited to specific one. Examples of the method of forming the recess 11 include etching methods such as a dry etching method and a wet etching method. With an etching method, the transparent substrate 20 is etched through the opening 63 so as to form the recess 11 having a cylindrical shape. Particularly, with a wet etching method, the recess 11 can be formed so as to have a shape closer to an ideal cylindrical shape. For example, a hydrofluoric acid based etchant or the like is suitably used as an etchant for wet etching. In this case, when alcohol (particularly polyhydric alcohol) such as glycerin is added to the etchant, the recess 11 can be formed so as to have a highly smooth surface.

Then, the mask layer 6 is removed. Particularly, the mask layer 6 can efficiently be removed with simple operation by immersion in a solution for removal. Thus, as shown in FIG. 11E, it is possible to produce a first fixed substrate 10 having the recess 11 formed at a predetermined position in a surface thereof.

Step 2: Formation of a Drive Electrode 23

Next, as shown in FIG. 11F, a drive electrode 23 is formed on the recess 11. Examples of a material used for the drive electrode 23 include metal such as Cr, Al, Al alloys, Ni, Zn, Ti, and Au, resin in which carbon or titanium is dispersed, silicon such as polycrystalline silicon (polysilicon) and amorphous silicon, and transparent conductive materials such as ITO. The drive electrode 23 is provided on a bottom of the recess 11. It is desirable that the drive electrode 23 has a (plane) shape corresponding to a (plane) shape of the formed recess 11. For example, the drive electrode 23 can be formed by a vapor deposition method, a sputtering method, or an ion plating method. Further, a photolithography method may be combined with these methods. Specifically, a resist layer (not shown) having a pattern corresponding to the drive electrode 23 is formed on the first fixed substrate 10. Examples of a material used for the resist layer include Cr, Au, and Cr. Then, the metal which was used as a mask in the previous step is removed with the resist layer being used as a mask. Thus, the drive electrode 23 is formed on the recess 11.

Then, as shown in FIG. 11G, an insulating film (insulator) 220 is formed by a CVD method. The insulating film 220 is made of silicon oxide ($SiO_2$), silicon nitride (SiNX), silicon oxynitride (SiOHN), or the like.

Thus, it is possible to obtain the first fixed substrate 10 having the recess 11 formed therein, the drive electrode 23 formed at the predetermined position on the first fixed substrate 10, and the insulating film 220 formed on the surface of the drive electrode 23.

Step 3: Bond of a Wafer (Base Material) 7 and the First Fixed Substrate 10

First, a wafer 7 is prepared as shown in FIG. 11H. It is desirable that the wafer 7 has a characteristic that a surface thereof can be formed as a mirror-finished surface. From this point of view, for example, a silicon-on-insulator (SOI) substrate, a silicon-on-sapphire (SOS) substrate, or the like may be used as the wafer 7. In this example, an SOI substrate is used as the wafer 7. As shown in FIG. 11H, an SOI substrate is formed as a three-layer laminated structure (laminated substrate) having a base layer 71 made of silicon, an $SiO_2$ layer (insulating layer) 72, a silicon layer (active layer) 73, which are stacked in the order named. Among the respective layers of the wafer 7, the base layer 71 and the $SiO_2$ layer 72 are to be removed, and the silicon layer 73 is to be processed into the movable substrate 3. Thickness of the wafer 7 is not limited to a specific value. Particularly, it is desirable that the silicon layer 73 has a thickness of about 10 to 100 μm. The movable substrate 3 can readily be manufactured by using such a wafer 7.

Then, as shown in FIG. 11I, the wafer 7 and the first fixed substrate 10 are bonded to each other in a manner such that the silicon layer 73 of the wafer 7 faces the surface of the first fixed substrate 10 in which the recess 11 is formed. For example, the wafer 7 and the first fixed substrate 10 can be bonded to each other by an anodic bonding process. For example, the anodic bonding process is performed as follows: First, the first fixed substrate 10 is connected to a negative terminal (not shown) of a DC power source while the wafer 7 is connected to a positive terminal (not shown) of the DC power source. The first fixed substrate 10 is heated while a voltage is applied between the terminals. Heating of the fixed substrate 2 facilitates movement of $Na^+$. According to the movement of $Na^+$, a bonding surface of the first fixed substrate 10 is negatively charged while a bonding surface of the wafer 7 is positively charged. As a result, the first fixed substrate 10 and the wafer 7 are firmly bonded to each other. Hereinafter, "anodic bonding" will also be simply referred to as "bonding."

Step 4: Formation of a Movable Substrate 3

Next, as shown in FIG. 11J, the base layer 71 is removed by etching or polishing. For example, wet etching or dry etching may be employed for removal of the base layer 71. Dry etching is preferably used for this purpose. In either case, the $SiO_2$ layer 72 serves as a stopper when the base layer 71 is removed. Because dry etching uses no etchant, the silicon layer 73, which faces the drive electrode 23, is suitably prevented from being damaged. Accordingly, it is possible to enhance a yield of manufacturing optical tunable filters.

First, a wet etching process will be described. The wafer 7 and the first fixed substrate 10 that are bonded to each other are immersed, for example, in a KOH solution having a concentration of about 1 to 40 weight %, preferably about 10 weight %. A reaction formula of this etching process is represented by

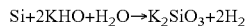

With use of the KOH solution, an etching rate of the base layer 71 is considerably higher than an etching rate of the $SiO_2$ layer 72. Accordingly, the $SiO_2$ layer 72 serves as a stopper for the etching process. In addition to the KOH solution, examples of the etchant used in this etching process include a tetraethylammonium hydroxide (TMAH) solution, an ethylenediamine-pyrocatechol-diazine (EPD) solution, and a hydrazine solution. According to the wet etching process, batch processing can be conducted so as to improve productivity.

Next, a dry etching process will be described. The wafer 7 and the first fixed substrate 10 that are bonded to each other are introduced into a chamber, which is supplied, for example, with $XeF_2$ having a pressure of 390 Pa for 60 seconds. A reaction formula of this etching process is represented by

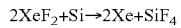

With the dry etching process using $XeF_2$, an etching rate of the base layer 71 is considerably higher than an etching rate of the $SiO_2$ layer 72. Accordingly, the $SiO_2$ layer 72 serves as a stopper for the etching process. Since this etching process does not employ plasma, portions other than portions to be removed are unlikely to be damaged. For example, plasma etching with $CF_4$ or $SF_6$ may be used instead of etching with $XeF_2$.

Any known polishing methods may be used to remove the base layer 71, and an explanation of such methods is omitted.

In the above manner, the base layer 71 can suitably be removed from the wafer 7.

Then, as shown in FIG. 11K, the $SiO_2$ layer 72 is etched and removed from the wafer 7. It is desirable to use an etchant containing hydrofluoric acid to etch the $SiO_2$ layer 72. Such an etchant can suitably remove the $SiO_2$ layer 72.

Thereafter, a resist layer (not shown) having a pattern corresponding to (plane) shapes of a movable portion 31 and support portions 32 is formed on the silicon layer 73. The wafer 7 is then etched by a dry etching method, particularly an inductively coupled plasma etching (ICP) method. As a result, as shown in FIG. 11L, it is possible to produce a movable substrate 3 having a movable portion 31 with an opening 311, support portions 32, and a fixed portion 33.

In this example, an ICP etching process is performed. Specifically, etching with an etching gas and formation of a protective film with a deposition gas are alternately performed repeatedly to form the movable portion 31 and the support portions 32. Examples of the etching gas include $SF_6$, and examples of the deposition gas include $C_4F_8$. As a result, only the silicon layer 73 can be etched. Further, by using a dry etching process, the movable portion 31, the support portions 32, and the fixed portion 33 can reliably be formed accurately without adverse influences on other portions.

As described above, a dry etching process, particularly an ICP etching process, is employed to form the movable portion 31, the support portions 32, and the fixed portion 33. Accordingly, the movable portion 31, in particular, can reliably be formed with ease and accuracy.

The movable portion 31, the support portions 32, and the fixed portion 33 may be formed by other dry etching processes such as a reactive ion etching (RIE) process. Further, the movable portion 31, the support portions 32, and the fixed portion 33 may be formed by any process other than a dry etching process.

Step 5: Formation of a Movable Reflection Film 210 on a Light-Transmittable Substrate 4

Next, a light-transmittable substrate 4 is prepared as shown in FIG. 11M. Examples of a material used for the light-transmittable substrate 4 include the same materials as described for the transparent substrate 20.

Then, as shown in FIG. 11N, a movable reflection film 210 is formed on an upper surface of the light-transmittable substrate 4. Specifically, a reflection film formed of a multilayer film is formed on the upper surface of the light-transmittable substrate 4. For example, the reflection film may be formed by a chemical vapor deposition (CVD) method, a sputtering method, or a vapor phase epitaxy method such as a vapor deposition method, or the like. For example, it is desirable that the multilayer film is made of a material such as silicon oxide ($SiO_2$), tantalum pentoxide ($Ta_2O_5$), or silicon nitride (SiN). These materials can provide a reflection film having an extremely high reflectance or an antireflection film having an extremely low reflectance (an extremely high transmittance). These films are alternately stacked so as to form a multilayer film having a predetermined thickness. By setting (adjusting) thickness of respective layers, the number of layers, and materials of layers, it is possible to form a multilayer film that can transmit or reflect light having a predetermined wavelength (or change characteristics of a multilayer film). For example, a reflectance of a reflection film can be adjusted by setting thickness of respective layers in the reflection film, and a wavelength of light to be reflected on a reflection film can be adjusted by setting the number of layers in the reflection film. Thus, it is possible to readily form a reflection film 210 having desired characteristics. Thickness of the entire reflection film 210 is not limited to a specific value. Preferably, the reflection film 210 has a thickness of about 1 to 4 μm.

Note that Step 5 can also be employed to deposit a fixed reflection film 200, an antireflection film 100, and an antireflection film 110. For example, an antireflection ratio (transmittance) of an antireflection film can be adjusted by setting thickness of respective layers in the antireflection film, and a wavelength of light to be transmitted through an antireflection film can be adjusted by setting the number of layers in the antireflection film.

Step 6: Bond of the Light-Transmittable Substrate 4 to the Movable Portion 31

Next, as shown in FIG. 11O, the light-transmittable substrate 4 is bonded to the movable portion 31 so as to cover the opening 311.

Step 7: Formation of a Second Fixed Substrate 5

Subsequently, a light-transmittable substrate 50 is prepared as shown in FIG. 11P. The transparent substrate 50 is a base material for a second fixed substrate 5. Examples of a material used for the light-transmittable substrate 50 include the same materials as described for the transparent substrate 20.

As shown in FIG. 11Q, a recess 51 is formed in the transparent substrate 50. The recess 51 can be formed and prepared in the same manner as the recess 11. Thus, it is possible to produce a second fixed substrate 5.

Step 8: Formation of a Fixed Reflection Film 200

Next, as shown FIG. 11R, a fixed reflection film 200 is formed at a bottom of the recess 51. Thickness of the entire fixed reflection film 200 is not limited to a specific value. Preferably, the fixed reflection film 200 has a thickness of 1 to 4 µm.

Step 9: Bond of the Second Fixed Substrate 5 and the Movable Substrate 3

Next, as shown in FIG. 11S, the second fixed substrate 5 and the movable substrate 3 are bonded to each other in a manner such that the fixed reflection film 200 and the movable reflection film 210 face each other. Thus, a closed space is defined by the recess 11 and the recess 51. It is desirable to bond the first fixed substrate 10 and the movable substrate 3 in a manner such that the closed space is under vacuum (vacuum seal) or that the closed space is decompressed (decompressed seal). With vacuum seal or decompressed seal, it is possible to further stabilize a driving characteristic of the movable portion 31.

Step 10: Formation of Antireflection Films 100 and 110

Then, an antireflection film 100 is formed on a lower surface of the first fixed substrate 10, and an antireflection film 110 is formed on an upper surface of the second fixed substrate 5. Timing of forming the antireflection films 100 and 110 is not specifically limited. The antireflection films 100 and 110 may be formed at desired timing before Step 10.

According to the above steps, it is possible to obtain an optical tunable filter 2001 as shown in FIGS. 8 and 9.

As described above, according to a method of manufacturing an optical tunable filter 2001 of the present invention, since the movable reflection film 210 is formed on the surface of the light-transmittable substrate 4, the thickness of the movable reflection film 210 can reliably be controlled with ease. Accordingly, coherent light emitted from the interference gap 9 is reliably prevented from being attenuated due to non-uniformity of the thickness of, the movable reflection film 210.

Further, since the movable substrate 3 is made of silicon, the movable portion 31, the support portions 32, and the fixed portion 33 can be formed integrally with each other so as to simplify a manufacturing process of the optical tunable filter 2001.

Additionally, a step for releasing a sacrifice layer is not required to manufacture an optical tunable filter 2001. Therefore, it is not necessary to form a release hole in the movable portion 31. Thus, it possible to simplify a manufacturing process of the movable portion 31. Since an area of a portion of the movable portion 31 (of the movable substrate 3) to which Coulomb forces are applied is not reduced, it is possible to reduce a voltage to be applied between the movable portion 31 and the drive electrode 23.

Further, since the insulating film 220 is formed on the drive electrode 23, the movable portion 31 and the drive electrode 23 are prevented from being stuck on each other, i.e., sticking is prevented. Thus, it is possible to form a reliable insulating structure.

Furthermore, since a closed space is defined by the recess 11 and the recess 51, it is possible to improve and stabilize a driving characteristic of the movable portion 31.

In addition to the effects described above, the optical tunable filter 2001 shown in FIGS. 8 and 9 is also advantageous in that it can be manufactured at a relatively low cost.

Fourth Embodiment

Figure 12:
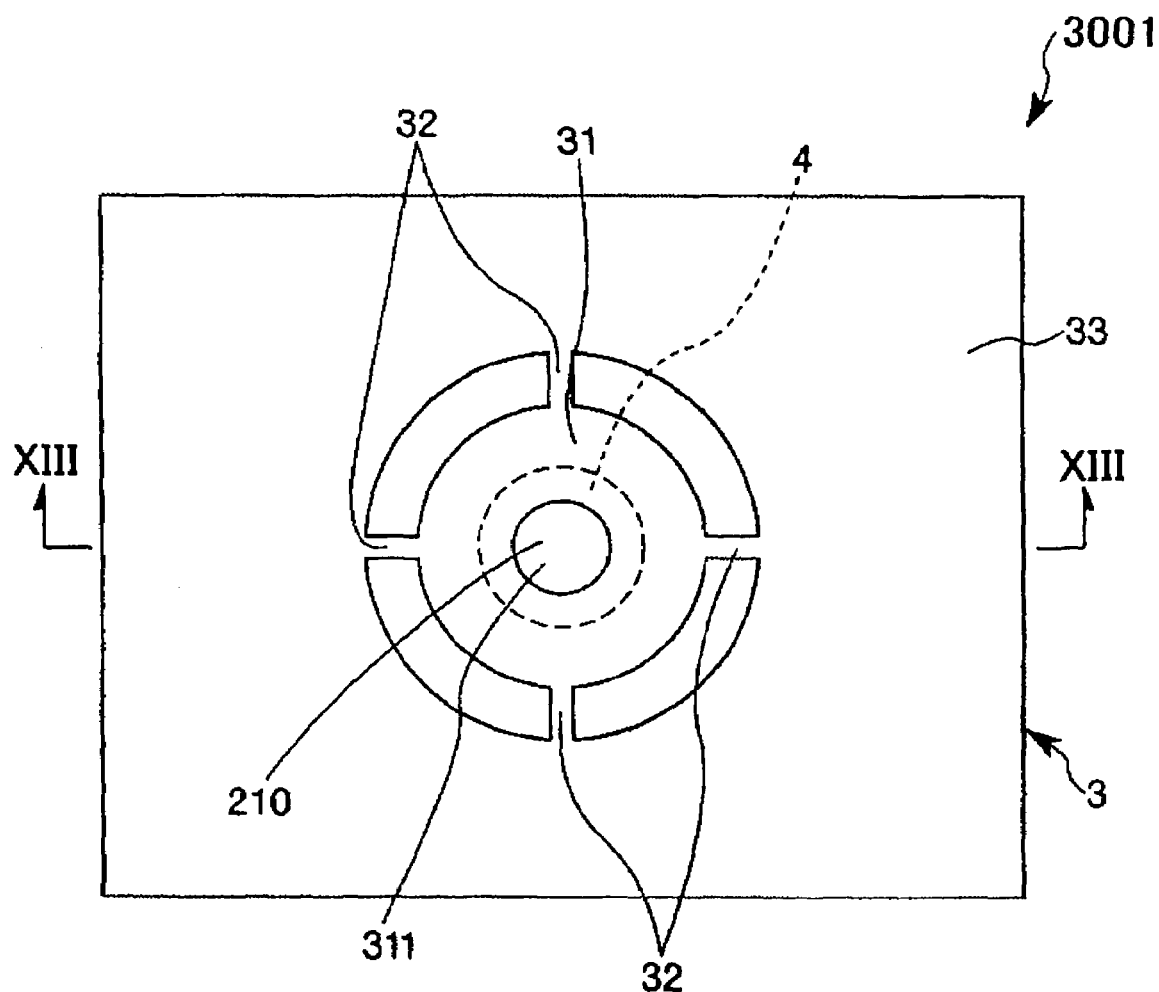
FIG. 12 is a plan view showing an optical tunable filter including a movable substrate and a light-transmittable substrate according to a fourth embodiment of the present invention.
Figure 13:
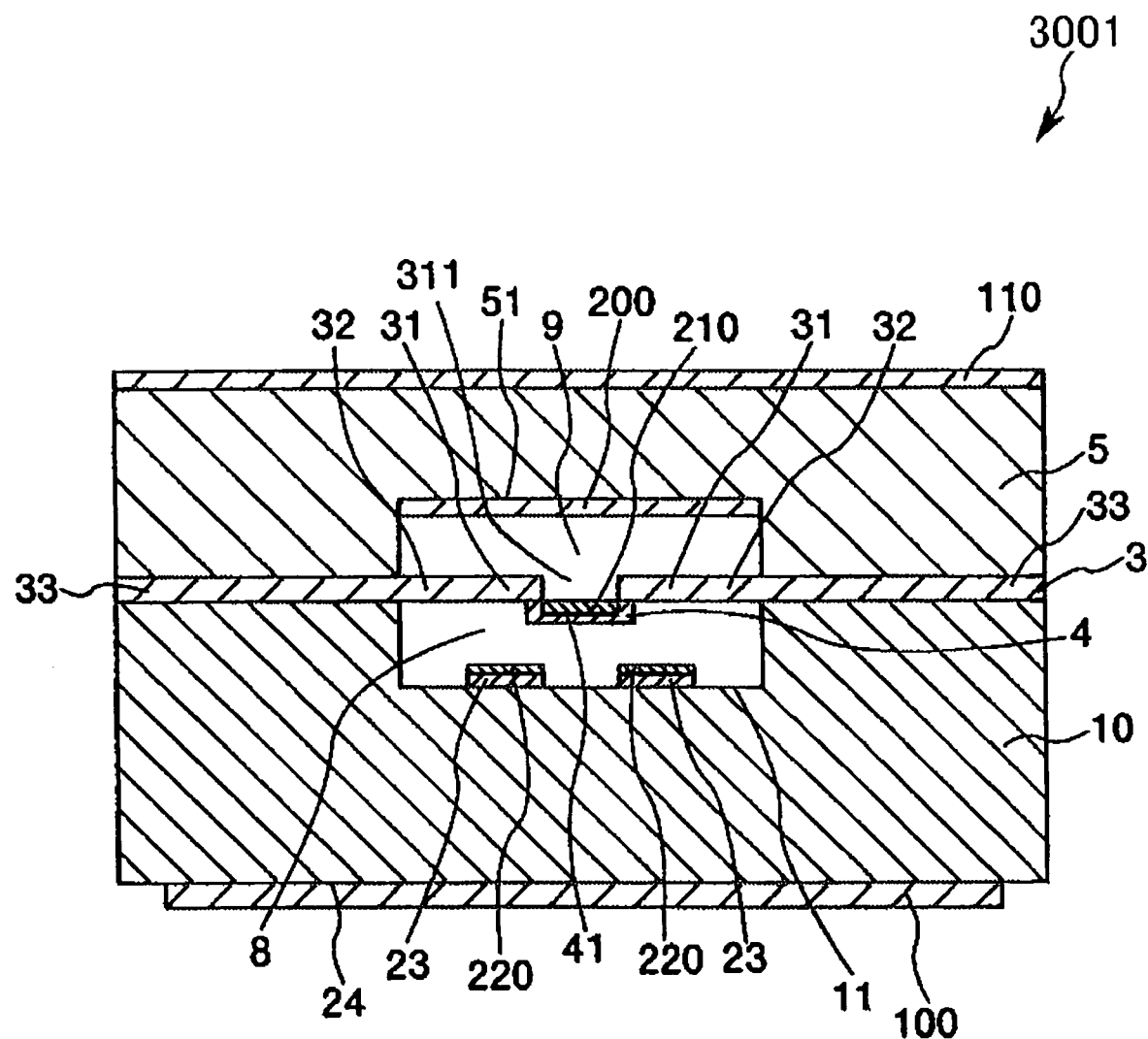
FIG. 13 is a cross-sectional view taken along line XIII-XIII in FIG. 12.

An optical tunable filter according to a fourth embodiment of the present invention will be explained. FIG. 12 is a plan view (top view) showing an optical tunable filter 3001 including a movable substrate and a light-transmittable substrate according to the fourth embodiment of the present invention. FIG. 13 is a cross-sectional view taken along line XIII-XIII in FIG. 12. The following description of the optical tunable filter 3001 in the fourth embodiment is mainly focused on differences between the fourth embodiment and the third embodiment. Similar portions will not be described repetitively.

The optical tunable filter 3001 of the fourth embodiment is different from the optical tunable filter 2001 of the third embodiment in that a light-transmittable substrate 4 is bonded to (provided on) a movable portion 31 at a different location than that in the third embodiment. As shown in FIGS. 12 and 13, in the optical tunable filter 3001 of the fourth embodiment, the light-transmittable substrate 4 is bonded to (provided on) a surface (lower surface in FIG. 13) of the movable portion 31 which faces a bottom of a recess 51. The light-transmittable substrate 4 has a recessed portion 41 formed at a location corresponding to an opening 311. An antireflection film 110 is provided within the recessed portion 41. Specifically, as viewed in a thickness direction of the optical tunable filter 3001 (in a vertical direction in FIG. 13), the entire antireflection film 110 is located within the recessed portion 41.

The optical tunable filter 3001 of the fourth embodiment also has the same advantageous effects as those in the optical tunable filter 2001 of the third embodiment.

A method of manufacturing an optical tunable filter 3001 of the fourth embodiment will be described below. The following description is mainly focused on differences between a method in the fourth embodiment and the method in the third embodiment. Similar portions will not be described repetitively.

FIGS. 14A through 14D are diagrams explanatory of a method of manufacturing an optical tunable filter 3001 according to the fourth embodiment. The method of manufacturing the optical tunable filter 3001 according to the fourth embodiment is the same as the method of manufacturing the optical tunable filter 2001 according to the third embodiment except for Step 3 and its subsequent steps. Thus, Step 3 and its subsequent steps will be described below.

Step 3: Formation of a Movable Reflection Film 210 on a Light-Transmittable Substrate 4

Figure 14A:
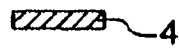
FIGS. 14A through 14D are diagrams explanatory of a method of manufacturing an optical tunable filter according to the fourth embodiment.
Figure 14B:
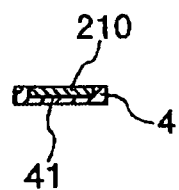

First, a light-transmittable substrate 4 is prepared as shown in FIG. 14A. The light-transmittable substrate 4 is etched on an upper surface thereof to form a recessed portion 41. Then, as shown in FIG. 14B, a movable reflection film 210 is formed within the recessed portion 41.

Step 4: Bond of a Wafer (Base Material) 7 and the Light-Transmittable Substrate 4

Figure 14C:
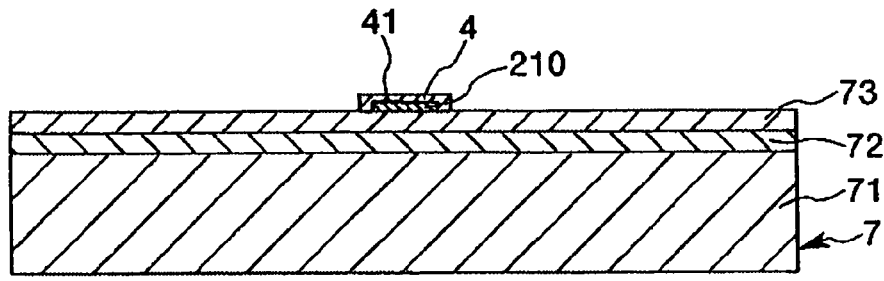

Next, as shown in FIG. 14C, the light-transmittable substrate 4 is bonded to a silicon layer 73 of the wafer 7 at a location corresponding to a portion to be the opening 311 in a manner such that the movable reflection film 210 faces the silicon layer 73.

Step 5: Bond of the Wafer 7 and the First Fixed Substrate 10

Figure 14D:
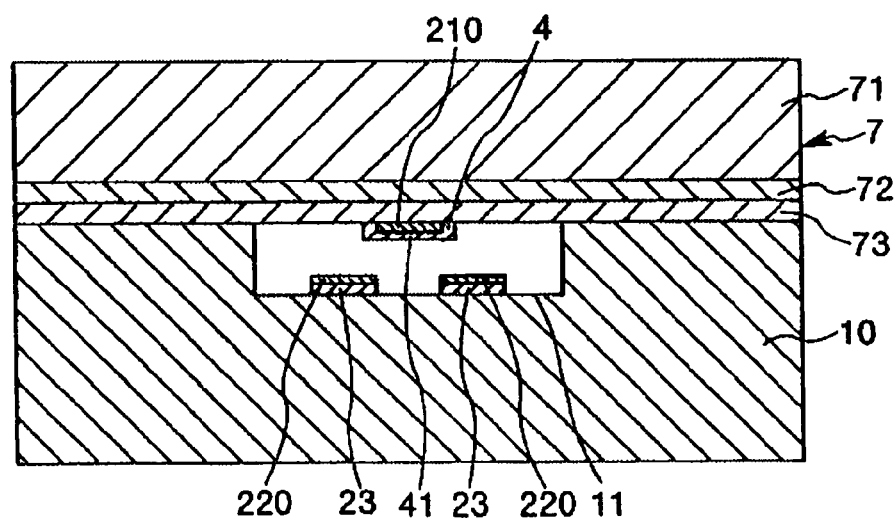

Then, as shown in FIG. 14D, the wafer 7 and the first fixed substrate 10 are bonded to each other in a manner such that the light-transmittable substrate 4 faces a recess 11 in a first fixed substrate 10.

Step 6: Formation of a Movable Substrate 3

Next, a movable substrate 3 is formed from the wafer 7 in the same manner as Step 4 in the third embodiment. Then, the same steps as Step 7 to 10 in the third embodiment are performed.

With the aforementioned steps, it is possible to manufacture an optical tunable filter 3001 of the third embodiment as shown in FIGS. 12 and 13.

Although an optical tunable filter and a method of manufacturing an optical tunable filter according to the present invention have been described with reference to the illustrated embodiments, the present invention is not limited to the illustrated embodiments. Respective components in the above embodiments may be replaced with any element having a similar function. Further, any other elements or steps may be added to the present invention. Furthermore, two or more components (features) or steps in the above embodiments may be combined with each other.

In the above embodiments, the antireflection films 100 and 110, the movable reflection film 210, and the fixed reflection film 200 are formed of multilayer films. However, the present invention is not limited to these examples. Each of the antireflection films 100 and 110, the movable reflection film 210, and the fixed reflection film 200 may be formed of a single-layer film. In this case, silicon oxynitride (SiOHN) is preferably used for a single-layer film because it is possible to form a reliable insulating structure.

In the above embodiments, the antireflection films 100 and 110, the movable reflection film 210, and the fixed reflection film 200 serve as insulating films. However, the present invention is not limited to these examples. For example, an insulating film may separately be provided. In such a case, an $SiO_2$ layer formed by thermal oxidation, an $SiO_2$ layer formed by TEOS-CVD, or the like is suitably used for an insulating film.

In the above embodiments, insulating treatment is performed only on the drive electrode 23, out of the drive electrode 23 and the movable substrate 3, to form an insulating film 220. However, the present invention is not limited to these examples. It is desirable to perform insulating treatment on both of the drive electrode 23 and the movable substrate 3. In this case, it is desirable that insulating treatment is performed on the movable substrate 3 to cover a surface of the movable substrate with an insulating film made of silicon oxide, silicon nitride, or silicon oxynitride because it is possible to form a reliable insulating structure.

In the above embodiments, Coulomb forces are utilized for the driving unit. However, the present invention is not limited to these examples.

Other substrates (or layers) may be provided between substrates except on anode bonding surfaces.

In the above embodiments, anode bonding is used as a bonding method of the substrates. However, the present invention is not limited to this example. For example, the substrates may be bonded by hot pressing connection, an adhesive, or low-melting glass.

An optical tunable filter according to the present invention is not limited to a specific application. For example, an optical tunable filter according to the present invention may be used for a sensor for measuring infrared absorption spectra of a measured object (or sample) to be measured. Infrared light having a predetermined wavelength is applied to the object and transmitted through the object. Infrared light transmitted through the object is introduced into the optical tunable filter. Coherent light emitted from the optical tunable filter is measured by the sensor to measure infrared absorption spectra of the object.

According to the present invention, light having a wavelength shorter than infrared light can pass through an optical tunable filter. Accordingly, the present invention is also applicable to inspection of an UV absorption spectrum and an imaging device. When an optical tunable filter according to the present invention is applied to inspection, a path in which an object to be measured is disposed may be provided on the optical tunable filter or inside the optical tunable filter, particularly in the fixed substrate. In such a case, it is possible to achieve a compact analyzer for measuring an object. Further, a light-receiving element such as a photodiode which receives coherent light emitted from the optical tunable filter, a microcomputer for analyzing coherent light emitted from the optical tunable filter, and the like may be added to the optical tunable filter.

Further, a gap amount (distance x) may be detected based on various kinds of information such as a capacity of a gap between the drive electrode 23 and the movable portion 31, a voltage applied between the drive electrode 23 and the movable portion 31, and coherent light emitted from the optical tunable filter. The information may be fed back to the microcomputer to accurately adjust the gap amount or accurately drive the movable portion.

Although certain preferred embodiments of the present invention have been shown and described in detail, it should be understood that various changes and modifications may be made therein without departing from the scope of the appended claims.

What is claimed is:

1. An optical tunable filter comprising:
a fixed substrate having a first recess formed therein;
a movable substrate bonded to said fixed substrate, said movable substrate including a movable portion having an opening formed at a location facing said first recess and a support portion for supporting said movable portion so that said movable portion can be displaced;
a light-transmittable substrate bonded to said movable portion at a location near said opening;
a fixed reflection film formed on a bottom of said first recess;
a movable reflection film formed on a surface of said light-transmittable substrate which faces said first recess;
an interference gap formed between said fixed reflection film and said movable reflection film for causing interference of light due to repeated reflection between said fixed reflection film and said movable reflection film; and
an actuator operable to displace said movable portion relative to said fixed substrate to vary a size of said interference gap for emitting light having a wavelength corresponding to the size of said interference gap to an exterior of said optical tunable filter.

2. The optical tunable filter as recited in claim 1, wherein said light-transmittable substrate is provided on a surface of said movable portion which faces said fixed substrate.

3. The optical tunable filter as recited in claim 1, wherein said light-transmittable substrate is bonded to a surface of said movable portion which faces said fixed substrate.

4. The optical tunable filter as recited in claim 1, further comprising:
a first antireflection film formed on a surface of said fixed substrate which is opposite to said interference gap; and a second antireflection film formed on a surface of said light-transmittable substrate which is opposite to said interference gap.

5. The optical tunable filter as recited in claim 1, wherein said light-transmittable substrate allows infrared light and light having a wavelength shorter than that of infrared light to pass therethrough.

6. The optical tunable filter as recited in claim 1, wherein said light-transmittable substrate covers said opening.

7. The optical tunable filter as recited in claim 1, wherein said movable substrate is made of silicon.

8. The optical tunable filter as recited in claim 1, wherein said movable portion has a substantially circular shape in a plan view.

9. The optical tunable filter as recited in claim 1, wherein said movable portion and said support portion are formed integrally with each other.

10. The optical tunable filter as recited in claim 1, wherein each of said fixed reflection film and said movable reflection film is formed of a multilayer film.

11. The optical tunable filter as recited in claim 1, wherein said movable reflection film has an insulating property.

12. An optical tunable filter comprising:
a fixed substrate having a first recess formed therein;
a movable substrate bonded to said fixed substrate, said movable substrate including a movable portion having an opening formed at a location facing said first recess and a support portion for supporting said movable portion so that said movable portion can be displaced;
a light-transmittable substrate bonded to said movable portion at a location near said opening;
a fixed reflection film formed on a bottom of said first recess;
a movable reflection film formed on a surface of said light-transmittable substrate which faces said first recess;
an interference gap formed between said fixed reflection film and said movable reflection film for causing interference of light due to repeated reflection between said fixed reflection film and said movable reflection film; and
an actuator operable to displace said movable portion relative to said fixed substrate to vary a size of said interference gap for emitting light having a wavelength corresponding to the size of said interference gap to an exterior of said optical tunable filter,
wherein said fixed substrate has a second recess formed in a surface thereof which faces said movable substrate,
wherein said actuator includes a drive gap formed between a bottom of said second recess and said movable substrate for displacing said movable portion relative to said fixed substrate within said drive gap.

13. The optical tunable filter as recited in claim 12, further comprising a driving electrode provided on the bottom of said second recess,
wherein said movable substrate has an electric conductivity,
wherein said actuator is configured to displace said movable portion with a Coulomb force produced due to a potential difference between said movable portion and said driving electrode.

14. The optical tunable filter as recited in claim 13, wherein at least one of surfaces of said movable substrate and said driving electrode is subjected to insulating treatment.

* * * * *